United States Patent
Nagai et al.

(10) Patent No.: US 9,627,711 B2
(45) Date of Patent: Apr. 18, 2017

(54) NON-AQUEOUS ELECTROLYTE SECONDARY BATTERY

(71) Applicants: Hiroki Nagai, Ama-gun (JP); Takumi Tamaki, Nisshin (JP)

(72) Inventors: Hiroki Nagai, Ama-gun (JP); Takumi Tamaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/410,650

(22) PCT Filed: Jul. 1, 2013

(86) PCT No.: PCT/IB2013/001405
§ 371 (c)(1),
(2) Date: Dec. 23, 2014

(87) PCT Pub. No.: WO2014/001899
PCT Pub. Date: Jan. 3, 2014

(65) Prior Publication Data
US 2015/0188183 A1    Jul. 2, 2015

(30) Foreign Application Priority Data
Jun. 29, 2012  (JP) ................. 2012-147862

(51) Int. Cl.
*H01M 10/04* (2006.01)
*H01M 2/16* (2006.01)
(Continued)

(52) U.S. Cl.
CPC ....... *H01M 10/0431* (2013.01); *B60L 3/0046* (2013.01); *B60L 3/04* (2013.01);
(Continued)

(58) Field of Classification Search
None
See application file for complete search history.

(56) References Cited

U.S. PATENT DOCUMENTS 7,638,230 B2 * 12/2009 Fujita ................. H01M 4/131
429/94
2005/0214637 A1 * 9/2005 Imachi ............... H01M 2/1653
429/144
(Continued)

FOREIGN PATENT DOCUMENTS

| JP | 2011-253684 A | 12/2011 |
|---|---|---|
| WO | 2012/049779 A1 | 4/2012 |
| WO | 2012063370 A1 | 5/2012 |

OTHER PUBLICATIONS

Nagai (WO 2012/049779) (a raw machine translation) (Abstract, Detailed Description & Drawings) (Apr. 19, 2012).*

*Primary Examiner* — Patrick Ryan
*Assistant Examiner* — Carmen Lyles-Irving
(74) *Attorney, Agent, or Firm* — Oliff PLC

(57) ABSTRACT

A non-aqueous electrolyte secondary battery includes a positive electrode, a negative electrode, and a separator disposed between the positive electrode and the negative electrode. The positive electrode of this secondary battery contains a positive electrode active substance having a hollow structure, which has a shell portion and a hollow portion formed inside the shell portion. In addition, a heat-resistant barrier layer is disposed between the positive electrode and the separator.

7 Claims, 4 Drawing Sheets

(51) Int. Cl.
  *H01M 4/505* (2010.01)
  *H01M 4/525* (2010.01)
  *H01M 10/0525* (2010.01)
  *H01M 4/131* (2010.01)
  *H01M 4/133* (2010.01)
  *B60L 3/00* (2006.01)
  *B60L 3/04* (2006.01)
  *B60L 11/00* (2006.01)
  *B60L 11/18* (2006.01)
  *H01M 4/02* (2006.01)

(52) U.S. Cl.
  CPC ........... *B60L 11/005* (2013.01); *B60L 11/185* (2013.01); *B60L 11/1861* (2013.01); *B60L 11/1864* (2013.01); *B60L 11/1877* (2013.01); *B60L 11/1879* (2013.01); *H01M 2/166* (2013.01); *H01M 2/1653* (2013.01); *H01M 2/1686* (2013.01); *H01M 4/131* (2013.01); *H01M 4/133* (2013.01); *H01M 4/505* (2013.01); *H01M 4/525* (2013.01); *H01M 10/0525* (2013.01); *B60L 2240/545* (2013.01); *B60L 2240/547* (2013.01); *B60L 2240/549* (2013.01); *H01M 2004/021* (2013.01); *H01M 2220/20* (2013.01); *Y02E 60/122* (2013.01); *Y02T 10/7011* (2013.01); *Y02T 10/7022* (2013.01); *Y02T 10/7044* (2013.01); *Y02T 10/7061* (2013.01); *Y02T 10/7072* (2013.01); *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 2006/0051663 A1* | 3/2006 | Fujita | H01M 4/131 429/142 |
| 2006/0141341 A1* | 6/2006 | Nishino | H01M 2/1653 429/62 |
| 2013/0209888 A1 | 8/2013 | Nagai | |
| 2013/0288121 A1 | 10/2013 | Nagai et al. | |

* cited by examiner

NON-AQUEOUS ELECTROLYTE SECONDARY BATTERY

BACKGROUND OF THE INVENTION

1. Field of the Invention

This invention relates to a non-aqueous electrolyte secondary battery. More specifically, this invention relates to a lithium secondary battery or other type of non-aqueous electrolyte secondary battery able to be used in a power source to be mounted in a vehicle.

2. Description of Related Art

Non-aqueous electrolyte secondary batteries such as lithium secondary batteries can be advantageously used as so-called portable power sources for personal computers, hand-held devices and the like or as power sources for vehicle propulsion. In particular, lithium ion secondary batteries able to achieve high energy density and low weight are becoming increasingly important as high output power sources for propelling vehicles such as electric vehicles (EV) and hybrid vehicles (HV). Among such non-aqueous electrolyte secondary batteries, those types of battery that use positive electrode active substances having a prescribed hollow structure can achieve high output with low state of charge (SOC), and are therefore preferred in applications where output at low SOC is required (for example, as power sources for vehicles such as HVs, plug-in hybrid vehicles (PHV) and EVs).

In addition, this type of secondary battery is typically constructed by housing an electrode body, which is obtained by laminating a positive electrode and a negative electrode via a separator, in a case together with a non-aqueous electrolyte. The above-mentioned separator has the function of electrically insulating the positive electrode from the negative electrode and also has the function of holding the non-aqueous electrolyte. Furthermore, the separator also has the function of softening when the battery generates heat and reaches a certain temperature (typically the softening point or melting point of the material that constitutes the separator), thereby blocking the conduction path of charge carriers (a shut down function). Some such separators are provided with a heat-resistant layer that contains a filler such as alumina in order to, for example, inhibit short circuiting caused by thermal contraction of the separator. In general, in cases where a battery generates heat due to, for example, a short circuit occurring inside the battery, the area around the point of short circuit on the surface of the negative electrode reaches a higher temperature than other parts of the battery. As a result, the above-mentioned heat-resistant layer is disposed so as to face the negative electrode. This type of heat-resistant layer is disclosed in Japanese Patent Application Publication No. 2011-253684 (JP 2011-253684 A).

SUMMARY OF THE INVENTION

As a result of investigations into thermal stability of secondary batteries that use positive electrode active substances having hollow structures, the inventors of this invention found a phenomenon that is characteristic of positive electrode active substances having hollow structures. That is, if the temperature inside a battery reaches a certain level or higher due to the battery generating heat as a result of overcharging and so on, the separator softens or melts, and a part of the molten separator (hereinafter referred to as molten product) may penetrate into the positive electrode. It became clear that in cases where the positive electrode contains a positive electrode active substance having a hollow structure, the degree of this penetration was greater than expected. Because of this phenomenon, cases in which a positive electrode active substance having a hollow structure is used exhibit inferior retention of separator shape (including the thickness and density of the separator) and increasingly undergo separator deformation (typically film rupture) than cases in which a positive electrode active substance having no hollows is used. It was found that this could be a cause of an increase in leakage current in secondary batteries that use positive electrode active substances having hollow structures. Based on these findings, the inventors of this invention completed this invention.

This invention relates to improvements in a non-aqueous electrolyte secondary battery that uses a positive electrode active substance having the above-mentioned hollow structure, and provides a non-aqueous electrolyte secondary battery having improved thermal stability.

This invention relates to a non-aqueous electrolyte secondary battery that includes a positive electrode, a negative electrode, and a separator disposed between the positive electrode and the negative electrode. The aforementioned positive electrode of this secondary battery contains a positive electrode active substance having a hollow structure, which has a shell portion and a hollow portion formed inside the shell portion. A heat-resistant barrier layer is disposed between the aforementioned positive electrode and the aforementioned separator.

According to this constitution, because the heat-resistant barrier layer is disposed between the positive electrode and the separator, a molten product of the separator is blocked by the above-mentioned heat-resistant barrier layer and does not penetrate into the positive electrode. As a result, a deterioration in the shape retention properties of the separator can be inhibited and leakage current, which is caused by the deterioration in shape retention properties, is reduced, and thermal stability is therefore improved. As is clear from this explanation, a deterioration in the above-mentioned shape retention properties of the separator is characteristic of positive electrodes that use positive electrode active substances having a hollow structures, and is fundamentally different from common thermal shrinkage of separators. In addition, inhibiting a deterioration in the shape retention properties of a separator by means of the above-mentioned heat-resistant barrier layer is a different action from inhibiting thermal shrinkage of publicly available separators.

The particle porosity of the aforementioned positive electrode active substance may be 15% or higher. It became clear for the first time that molten product of a separator penetrates into pores of the above-mentioned positive electrode active substance and that the penetrating quantity of molten product is a quantity which can cause the shape retention properties of the separator to deteriorate. Therefore, the effect brought about by the above-mentioned heat-resistant barrier layer (that is, when the separator melts due to an increase in battery temperature, the effect of blocking a part of the molten separator from penetrating into the positive electrode) is effectively realized in the above-mentioned constitution, and thermal stability is significantly improved.

The thickness of the shell portion of the aforementioned positive electrode active substance may be 2 μm or lower. Because a positive electrode active substance having such a constitution tends to be such that the volume of the hollow region inside a particle is large (that is, a high particle porosity), the effect brought about by the above-mentioned heat-resistant barrier layer is effectively realized, and thermal stability is significantly improved.

The thickness of the aforementioned heat-resistant barrier layer may be 2 μm or higher. A heat-resistant barrier layer having such a thickness can adequately block molten product of a separator from penetrating into a positive electrode.

The aforementioned separator may be constituted from a polyolefin-based resin. In addition, the aforementioned heat-resistant barrier layer contains a filler as the main component, and the filler is preferably at least one type of material selected from among the group consisting of alumina, boehmite, silica, titania, zirconia, calcia and magnesia.

The above-mentioned non-aqueous electrolyte secondary battery uses a positive electrode active substance having the above-mentioned hollow structure, and can therefore achieve good output characteristics even in low SOC regions. In addition, because the heat-resistant barrier layer is disposed between the positive electrode and the separator, excellent thermal stability is achieved. Therefore, by using this characteristic, this invention can be advantageously used as a driving power source for a vehicle such as an HV, a PHV or an EV. According to this invention, it is possible to provide a vehicle in which the above-mentioned non-aqueous electrolyte secondary battery (including a battery pack in which a plurality of batteries are connected) is mounted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
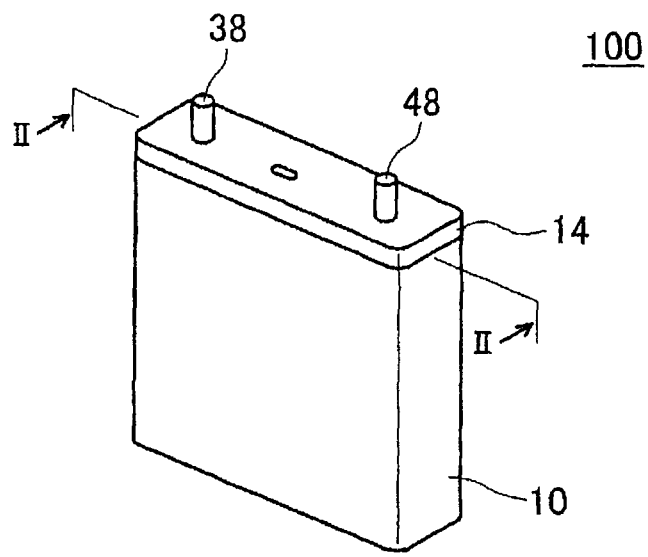
FIG. 1 is a perspective diagram showing a schematic view of the external form of a lithium secondary battery according to one embodiment.

Embodiments of this invention will now be explained with reference to the drawings. Moreover, the dimensional relationships (length, width, thickness and so on) in the drawings do not reflect actual dimensional relationships. In addition, matters other than the subject matter of this invention but which are essential for carrying out an embodiment of the invention (for example, the constitution and production method of an electrode body provided with a positive electrode and negative electrode, the constitution and production method of a separator or electrolyte liquid, and ordinary features relating to the construction of the battery, such as the shape of the battery (case)) are design matters that a person skilled in the art could understand on the basis of conventional art in this technical field. An embodiment of this invention can be carried out on the basis of the matters disclosed in this specification and common technical knowledge in this technical field. In addition, in the drawings shown below, members/parts that perform the same action are denoted by the same symbols, and duplicate explanations will be omitted or simplified.

A lithium secondary battery will be explained as an example of an embodiment relating to a non-aqueous electrolyte secondary battery, but the scope of this invention is in no way limited to such a battery. For example, this invention may be used in a non-aqueous electrolyte secondary battery having metal ions other than lithium ions (Li ions) (for example, sodium ions) as charge carriers. In addition, in this specification, "secondary battery" means batteries in general that are able to be repeatedly charged and discharged, and includes storage batteries such as lithium secondary batteries (that is, chemical cells) and capacitors such as electrical double layer capacitors (that is, physical cells). In addition, in this specification, "lithium secondary battery" means a secondary battery which uses Li ions as electrolyte ions and in which charging and discharging is achieved by charge transport between positive and negative electrodes brought about by Li ions. In general, batteries referred to as lithium ion secondary batteries are typical examples of batteries encompassed by lithium secondary batteries in this specification.

<<Lithium Secondary Battery>>

Figure 2:
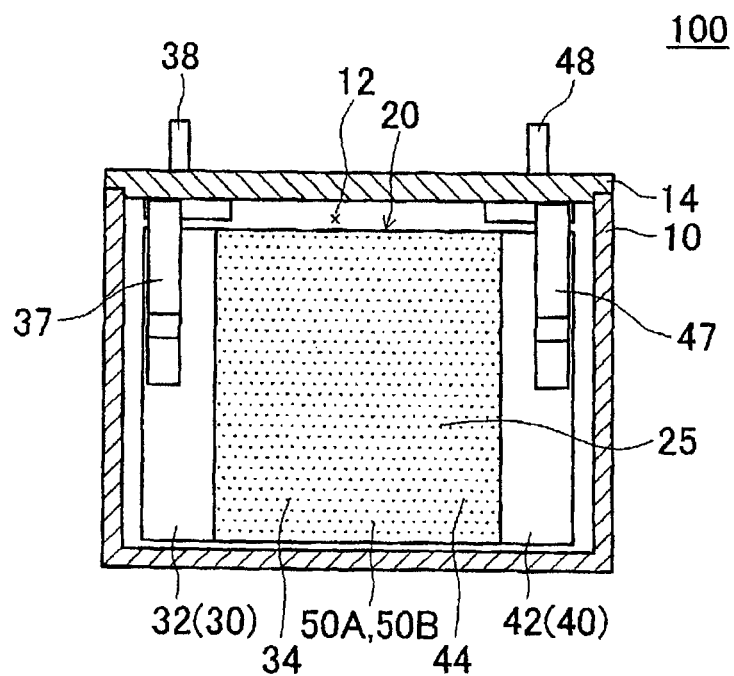
FIG. 2 is a cross sectional view along the line II-II in FIG. 1.

As shown in FIG. 1 and FIG. 2, a lithium secondary battery 100 includes a box-like angular battery case 10 and a wound electrode body 20 housed inside the battery case 10. The upper surface of the battery case 10 has an opening 12. This opening 12 is sealed with a lid 14 after the wound electrode body 20 is placed in the battery case 10 via the opening 12. A non-aqueous electrolyte (a non-aqueous electrolyte liquid) 25 is also housed in the battery case 10. The lid 14 is provided with an external positive electrode terminal 38 and an external negative electrode terminal 48, which are used for external connections. These terminals 38 and 48 partially protrude from the surface of the lid 14. In addition, a part of the external positive electrode terminal 38 is connected to an internal positive electrode terminal 37 inside the battery case 10, and a part of the external negative electrode terminal 48 is connected to an internal negative electrode terminal 47 inside the battery case 10.

Figure 3:
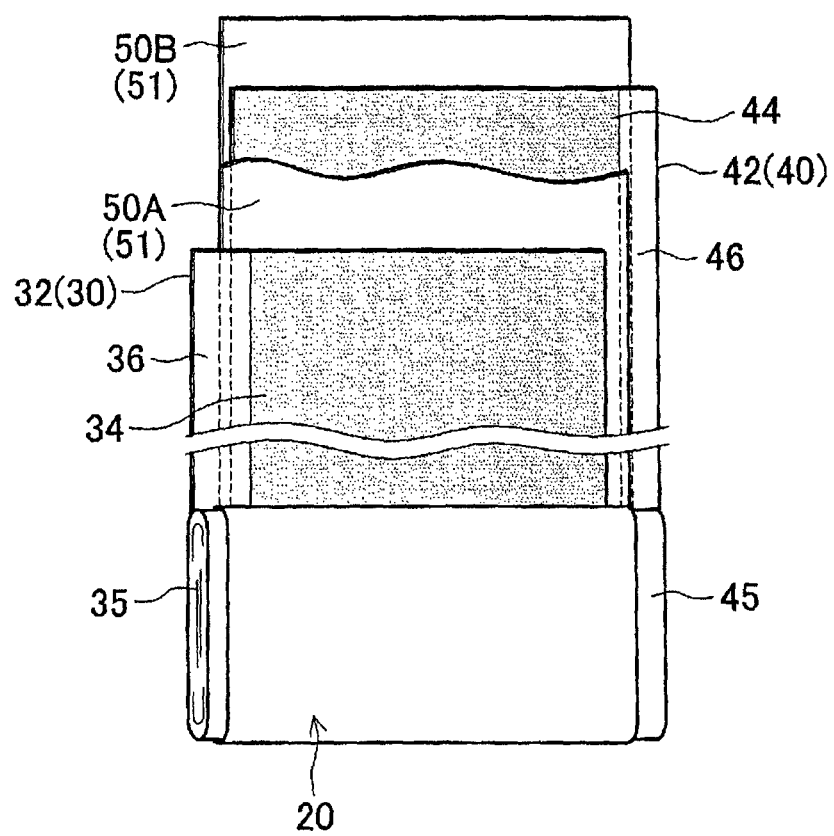
FIG. 3 is a perspective diagram showing a schematic view of a mode in which an electrode body is produced by winding according to one embodiment.

As shown in FIG. 3, the wound electrode body 20 includes a long sheet-like positive electrode (a positive electrode sheet) 30 and a long sheet-like negative electrode (a negative electrode sheet) 40. The positive electrode sheet 30 includes a long positive electrode current collector 32 and a positive electrode mixture layer 34, which is formed on at least one surface (and typically both surfaces) of the positive electrode current collector 32. The negative electrode sheet 40 includes a long negative electrode current collector 42 and a negative electrode mixture layer 44, which is formed on at least one surface (and typically both surfaces) of the negative electrode current collector 42. The wound electrode body 20 also includes two long sheet-like separators (separator sheets) 50A and 50B. The positive electrode sheet 30 and the negative electrode sheet 40 are laminated via the two separator sheets 50A and 50B, and laminated in the following order: positive electrode sheet 30, separator sheet 50A, negative electrode sheet 40, separator sheet 50B. The laminate is formed into a wound body by being wound in the longitudinal direction, and this wound body is then formed into a flattened shape by being squashed from the lateral direction. Moreover, the electrode body is not limited to a wound electrode body. The electrode may have a shape and configuration that is suitable for the shape and intended use of the battery.

A tightly laminated portion, which is obtained by overlapping the positive electrode mixture layer 34 formed on the surface of the positive electrode current collector 32 and the negative electrode mixture layer 44 formed on the surface of the negative electrode current collector 42, is formed in the central part of the wound electrode body 20 in the width direction orthogonal to the winding direction. In addition, one edge of the positive electrode sheet 30 in the width direction is provided with an exposed part on which the positive electrode of mixture layer 34 is not formed and the positive electrode current collector 32 is exposed (a positive electrode mixture layer-free part 36). This positive electrode mixture layer-free part 36 protrudes from the separator sheets 50A and 50B and the negative electrode sheet 40. That is, a positive electrode current collector laminated part 35, on which the positive electrode mixture layer-free part 36 of the positive electrode current collector 32 overlaps, is formed on one edge of the wound electrode body 20 in the width direction. In addition, in the same way as the positive electrode sheet 30 on the above-mentioned edge, a negative electrode current collector laminated part 45, on which the negative electrode mixture layer-free part 46 of the negative electrode current collector 42 overlaps, is formed on the other edge of the wound electrode body 20 in the width direction. Moreover, the separator sheets 50A and 50B are wider than the positive electrode mixture layer 34 and the negative electrode mixture layer 44 and are narrower than the wound electrode body 20. By disposing the separator sheets 50A and 50B so that this is sandwiched by the laminated part of the positive electrode mixture layer 34 and the negative electrode mixture layer 44, a short circuit caused by the positive electrode mixture layer 34 and the negative electrode mixture layer 44 coming into contact can be prevented.

Figure 4:
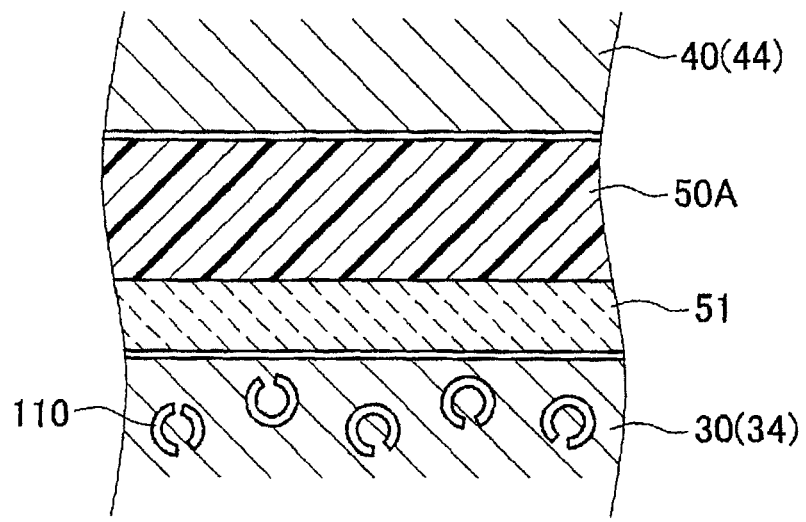
FIG. 4 is a diagram showing an expanded view of a part of a cross section of an example of the constitution between the positive and negative electrodes shown in FIG. 3.

The separator sheet 50A is constituted from a porous resin layer and, as shown in FIG. 4, a heat-resistant barrier layer 51 is formed on the positive electrode sheet 30 side surface of the separator sheet 50A. The heat-resistant barrier layer 51 is formed on the entire surface of the separator sheet 50A, that is, on the entire separator sheet 50A in the length direction (the winding direction) and the width direction. Moreover, FIG. 4 schematically shows that the positive electrode mixture layer 34 contains a positive electrode active substance 110 having a hollow structure.

According to the above-mentioned constitution, a deterioration in the shape retention properties of the separator sheet 50A can be inhibited and leakage current, which is caused by the deterioration in shape retention properties, is reduced, and thermal stability is therefore improved. This mechanism will now be explained. If the battery generates heat as a result of overcharging and so on and the temperature of the battery reaches a certain level or higher, the separator sheet 50A melts. In this case, it became clear that if the positive electrode sheet 30 (typically the positive electrode mixture layer 34), which contains the positive electrode active substance 110 having a hollow structure, and the separator sheet 50A face each other (typically, are adjacent to each other), molten product of the above-mentioned separator sheet 50A penetrates into the positive electrode mixture layer 34 and diffuses as far as the inner part (hollow part) of particles of the positive electrode active substance 110 having a hollow structure. As a result, the degree of penetration of the above-mentioned molten product into the positive electrode mixture layer 34 that contains the positive electrode active substance 110 having a hollow structure is greater than in a case in which the positive electrode mixture layer contains a positive electrode active substance having no hollows, meaning that the shape retention properties of the separator sheet 50A deteriorate. Typically, the thickness of the separator sheet 50A is reduced and portions having a low density are generated. It is thought that this deterioration in shape retention properties brings about deformation (typically rupture) of the separator sheet 50A, which tends to bring about an increase in leakage current. However, according to the above-mentioned constitution, because the heat-resistant barrier layer 51 is disposed between the positive electrode sheet 30 and the separator sheet 50A, molten product of the separator sheet 50A is blocked by this heat-resistant barrier layer 51 and does not penetrate into the positive electrode. As a result, a deterioration in the shape retention properties of the separator can be inhibited and leakage current, which is caused by the deterioration in shape retention properties, is reduced, and thermal stability is therefore improved. Moreover, the above-mentioned constitution can be one in which the separator and the negative electrode face each other, but it has been confirmed that molten separator produced by the battery generating heat and so on does not penetrate into the negative electrode (typically the negative electrode mixture layer).

Moreover, the heat-resistant barrier layer is not limited to being formed on the separator as long as the heat-resistant barrier layer is disposed between the positive electrode and the separator. For example, the heat-resistant barrier layer may be formed on at least one surface of the positive electrode. In addition, the heat-resistant barrier layer may be formed on both surfaces of the separator. Furthermore, a heat-resistant layer other than the above-mentioned heat-resistant barrier layer (layer having a composition that is different from that of the heat-resistant barrier layer) may be disposed between the positive and negative electrodes. In addition, the separator is not limited to a single layer structure and may be formed of a multilayer structure having two or more layers. A three layer structure film formed by polypropylene (PP)/polyethylene (PE)/PP can be given as a typical example thereof. The constitution of the separator sheet 50B is basically the same as that of the separator sheet 50A, and the explanation of this constitution will not be repeated. Moreover, in a case in which a solid (gel-like) electrolyte obtained by, for example, adding a polymer to an electrolyte liquid is used instead of an electrolyte liquid, the electrolyte per se can function as a separator and a separator is not needed.

<<Positive Electrode>>

The constituent elements that constitute a lithium secondary battery or other type of non-aqueous electrolyte secondary battery are not particularly limited, and with regard to matters other than those mentioned below, it is possible to use a constitution having similar constituent elements to a conventional secondary battery. For example, an electrically conductive member formed by a highly electrically conductive metal can be preferably used in the positive electrode current collector. This type of electrically conductive member can be, for example, aluminum or an alloy containing aluminum as the main component. The shape of the positive electrode current collector is not particularly limited due to being able to differ according to the shape of the battery and the like, and can be rod-like, plate-like, sheet-like, foil-like, mesh-like and so on. The thickness of the positive electrode current collector is also not particularly limited, and can be approximately 5 to 30 μm.

<Positive Electrode Active Substance>

(Basic composition) The positive electrode mixture layer contains the positive electrode active substance. The positive electrode active substance contains a lithium transition metal oxide having a layered crystal structure (typically a layered rock salt structure belonging to the hexagonal system). The above-mentioned lithium transition metal oxide contains a metallic element $M_T$. This $M_T$ is at least one element selected from among Ni, Co and Mn. The total content of Ni, Co and Mn (that is, the content of $M_T$) in the above-mentioned positive electrode active substance can be, for example, 85 mol % or higher (preferably 90 mol % or higher, and typically 95 mol % or higher) if the total quantity of all metallic elements ($M_{all}$) other than lithium contained in the positive electrode active substance is 100 mol %. A positive electrode active substance having a composition in which the above-mentioned $M_T$ contains at least Ni is preferred. For example, if the total quantity of metallic elements other than lithium contained in the positive electrode active substance is 100 mol %, a positive electrode active substance that contains 10 mol % or higher (and more preferably 20 mol % or higher) of Ni is preferred. A positive electrode active substance having such a composition is suitable for producing positive electrode active substance particles having a hollow structure by using the production method described below.

One example of the above-mentioned lithium transition metal oxide is a lithium transition metal oxide in which the above-mentioned $M_T$ contains each of Ni, Co and Mn (hereinafter referred to as a "LNCM oxide"). For example, if the total quantity of Ni, Co and Mn (that is, the quantity of $M_T$ ($m_{MT}$)) is 1 in terms of number of atoms, a LNCM oxide in which the quantity of each of Ni, Co and Mn is higher than 0 and not higher than 0.7 (for example, higher than 0.1 and not higher than 0.6, and typically higher than 0.3 and not higher than 0.5) can be preferably used. It is easy to synthesize the ternary LNCM oxide having a composition in which Li is contained in excess relative to the content of $M_T$ (that is, an LNCM oxide in which $1.00<(m_{Li}/m_{MT})$). This is thought to be because the above-mentioned LNCM oxide has the property of readily incorporating an excess of Li in a transition metal layer in the above-mentioned layered structure. Here, $(m_{Li}/m_{MT})$ is the (molar) ratio of the number of moles of Li ($m_{Li}$) relative to the number of moles of $M_T$ ($m_{MT}$). If the quantity of $M_T$ is 1 (in terms of number of atoms), it is preferable for the quantity of Ni and the quantity of Mn to be approximately equal (for example, for the difference between the quantity of Ni and the quantity of Mn to be 0.1 or lower). For example, a composition in which the quantities of Ni, Co and Mn are approximately equal is preferred. An LNCM oxide having the above-mentioned composition exhibits excellent thermal stability as a positive electrode active substance.

In addition to $M_T$ (that is, at least one element selected from among Ni, Co and Mn), the positive electrode active substance may also contain one or more other elements as additional constituent elements (added elements). The above-mentioned additional elements can be elements belonging to group 1 of the periodic table (alkali metals such as sodium), group 2 (alkaline earth metals such as magnesium and calcium), group 4 (transition metals such as titanium and zirconium), group 6 (transition metals such as chromium and tungsten), group 8 (transition metals such as iron), group 13 (boron, which is a metalloid element, or a metal such as aluminum) and group 17 (halogens such as fluorine). Typical examples thereof include W, Cr, Mo, Zr, Mg, Ca, Na, Fe, Zn, Si, Sn, Al, B and F. The total content of these additional constituent elements is 20 mol % or less, and preferably 10 mol % or less of the content of $M_T$. The positive electrode active substance may contact at least one metallic element ($M_A$) selected from among W, Cr and Mo as the above-mentioned added element. A positive electrode active substance having a composition that contains at least W as $M_A$ is particularly preferred. By incorporating W, it is possible to achieve the effect of reducing the reactive resistance of a battery that uses the positive electrode active substance. This feature can also contribute to an improvement in the output of the battery.

If the total number of moles ($m_{MT}$) of $M_T$ contained in the positive electrode active substance is 100 mol %, the content ($m_A$) of $M_A$ (for example, W) in the positive electrode active substance can be, for example, 0.001 to 5 mol %, and is generally 0.01 to 3 mol % and preferably 0.05 to 1 mol % (and more preferably 0.1 to 1 mol %, for example 0.2 to 1 mol %). In addition, if the total number of moles ($m_{Mall}$) of all the metallic elements other than lithium ($M_{all}$) contained in the positive electrode active substance is 100 mol %, the content ($m_A$) of $M_A$ (for example, W) in the positive electrode active substance can be, for example, 0.001 to 5 mol %, and is generally 0.01 to 3 mol % and preferably 0.05 to 1 mol % (and more preferably 0.1 to 1 mol %, for example 0.2 to 1 mol %). If the content of $m_A$ or $m_{Mall}$ is Too Low, the Effect of Inhibiting Growth of Primary Particle Size in the Length direction of the positive electrode active substance and the effect of optimizing the (003) plane/(104) plane half value width ratio (a ratio of a full width at half maximum of the (003) plane of a full width at half maximum of (104) plane) and the (104) plane/(003) plane integral width ratio (stacking factor (SF) value), as calculated from XRD analysis of the positive electrode active substance, cannot be achieved, and an improvement in the output of a battery tends to be unachievable. If the content of $m_A$ or $m_{Mall}$ is too high, the reactive resistance of a battery that uses the positive electrode active substance increases compared to a positive electrode active substance that does not contain $M_A$.

An example of the above-mentioned positive electrode active substance is a positive electrode active substance having a composition (an average composition) represented by general formula (I) below.

$$Li_{1+x}Ni_yCo_zMn_{(1-y-z)}M_{A\alpha}M_{B\beta}O_2 \qquad (I)$$

In formula (I) above, x can be a real number that satisfies the relationship $0 \leq x \leq 0.2$. y can be a real number that satisfies the relationship $0.1 < y < 0.6$. z can be a real number that satisfies the relationship $0.1 < z < 0.6$. $M_A$ is at least one type of metallic element selected from among W, Cr and Mo. α is a real number that satisfies the relationship $0 \leq \alpha \leq 0.01$ (typically, $0.0005 \leq \alpha \leq 0.01$, for example $0.001 \leq \alpha \leq 0.01$). Ma is one or more types of element selected from among the group consisting of Zr, Mg, Ca, Na, Fe, Zn, Si, Sn, Al, B and F. β can be a real number that satisfies the relationship $0 \leq \beta \leq 0.01$. β may be essentially 0 (that is, an oxide that contains substantially no $M_e$). Moreover, in the chemical formula that expresses a lithium transition metal oxide having a layered structure in this specification, the compositional ratio of O (oxygen) is shown as being 2 for the sake of convenience, but this value should not be interpreted too narrowly, and slight fluctuations in the composition (typically within the range of not lower than 1.95 and not higher than 2.05) are allowed.

(Hollow Structure)

The positive electrode active substance is typically in the form of particles having a hollow structure, which has a shell portion and a hollow portion (a cavity portion) formed inside the shell portion. Typically, the shape of the particles of the particulate positive electrode active substance (positive electrode active substance particles) can be approximately spherical or slightly distorted spheres, and the like. It is preferable for the above-mentioned shell portion to have through holes that connect the above-mentioned hollow portion to the outside of the particle. Hereinafter, a hollow structure having the above-mentioned through holes in the shell portion is referred to as a "perforated hollow structure". Moreover, particles having ordinary porous structures can be given as examples of particles that differ from particles having this type of hollow structure (unless otherwise indicated, this includes perforated hollow structures). Here, a porous structure means a structure in which material portions and cavity portions are both present throughout particle (a sponge-like structure). Positive electrode active substance particles obtained using a so-called spray baking method (also referred to as a spray drying production method) can be given as a typical example of positive electrode active substance particles having a porous structure. The positive electrode active substance particles having a hollow structure in this embodiment are such that the material part is concentrated in the shell portion and a clearly large defined space is formed in the above-mentioned hollow portion, and the clearly large defined space in the hollow portion is larger than the gaps present between primary particles that constitute secondary particles (between adjacent primary particles that are sintered with each other). Therefore, the positive electrode active substance particles are clearly different in terms of structure from positive electrode active substance particles having the above-mentioned porous structure.

The positive electrode active substance in this embodiment may be in the form of secondary particles formed by primary particles of the above-mentioned lithium transition metal oxide aggregating. Here, "primary particle" means a particle regarded as being a unit particle (an ultimate particle) when evaluated in terms of apparent geometric form. In this positive electrode active substance, the above-mentioned primary particles are typically aggregates of lithium transition metal oxide crystallites. The form of the positive electrode active substance can be observed using scanning electron microscope (SEM) images.

Figure 5:
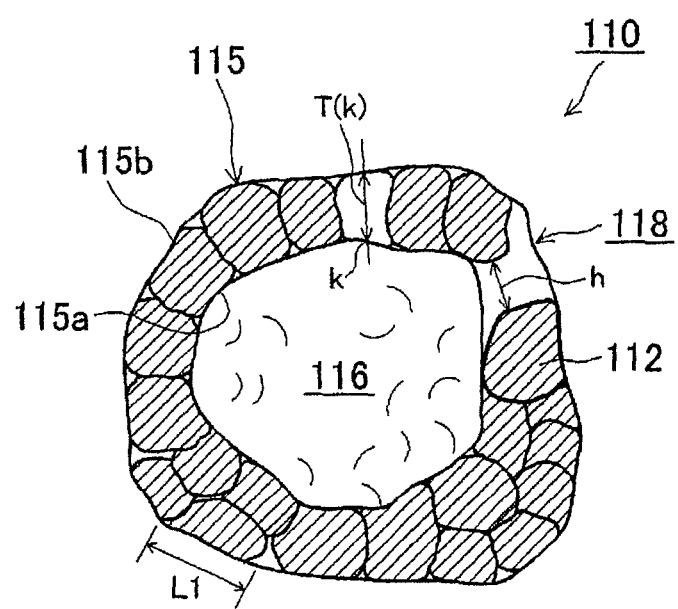
FIG. 5 is a cross sectional diagram showing a schematic view of a positive electrode active substance having a hollow structure according to one embodiment.

FIG. 5 shows a schematic view of a typical structure of the above-mentioned positive electrode active substance particle. This positive electrode active substance particle 110 is a particle having a hollow structure, which has a shell portion 115 and a hollow portion 116. The shell portion 115 has a form in which primary particles 112 are aggregated in the form of a spherical shell. A SEM image shows that a cross section of the shell portion 115 has a form in which primary particles 112 are linked in a ring-like shape (a beads-like manner). The primary particles 112 may be linked singly (in a single layer) across the entire shell portion 115, but may also be in a form whereby the positive electrode active substance particle has portions in which two or more primary particles 112 are linked by being stacked (in multiple layers). The number of layers of primary particles 112 in the above-mentioned stacked portion is preferably 5 or fewer (for example, 2 to 5), and more preferably 3 or fewer (for example, 2 to 3). The positive electrode active substance particle 110 may be constituted in a form in which the primary particles 112 are essentially linked in a single layer across the entire shell portion 115.

Positive electrode active substance particles (secondary particles) 110 having the above-mentioned constitution exhibit less aggregation of primary particles 112 than positive electrode active substance particles having a compact structure in which a cavity is not present inside the particle. Therefore, there are few grain boundary in the particles (and the Li ion diffusion distance is shorter), and diffusion of Li ions to the inside of the particles is rapid. By using this type of positive electrode active substance particle 110 having few grain boundaries, it is possible to effectively improve the output characteristics of a lithium secondary battery having the particles 110. For example, it is possible to construct a lithium secondary battery having a high output even in low SOC regions (in which the SOC is, for example, 30% or lower) in which the diffusion of ions to the inner part of the positive electrode active substance is rate-determining.

(Through Holes)

The positive electrode active substance particle 110 has a through hole 118, which penetrates the shell portion 115 and spatially connects the hollow portion 116 and the outside (the part outside the particle 110). By having a through hole 118, an electrolyte liquid can come and go between the hollow portion 116 and the outside and the electrolyte liquid can be satisfactorily replaced in the hollow portion 116. As a result, electrolyte liquid shortage hardly occurs in the hollow portion 116 and the primary particles 112 that face the hollow portion 116 can be actively used for charging and discharging. By having this constitution, effective contact can be achieved between the primary particles 112 and the electrolyte liquid, and it is possible to further improve the output characteristics of a lithium secondary battery (especially the output characteristics in low SOC regions).

The number of through holes 118 in the positive electrode active substance particle 110 is, on average, preferably 1 to 10 (for example, 1 to 5) per particle of the active substance 110. If the above-mentioned average number of through holes is too high, it can be difficult to maintain the hollow form of the particle. By using a positive electrode active substance particle 110 having a suitable average number of through holes, it is possible to ensure the strength of the positive electrode active substance particle 110 while favorably and stably achieving an effect of improved battery performance due to having a perforated hollow structure (for example, the effect of improving output).

As an average value for a plurality of positive electrode active substance particles, the opening width (h) of the through hole 118 can be approximately 0.01 µm or higher. Here, the opening width (h) of the through hole 118 means the length at the narrowest part of pathway (i.e., the through hole 118) between the outside of the positive electrode active substance particle 110 and the hollow portion 116. If the average value of the opening width of the through hole 118 is 0.01 µm or higher, the through hole 118 can function more effectively as a flow passage for an electrolyte liquid. As a result, the effect of improving the performance of a lithium secondary battery can be more satisfactorily achieved. Moreover, in a case where a single positive electrode active substance particle 110 has a plurality of through holes 118, the opening width of the through hole having the largest opening width among this plurality of through holes 118 can be taken to be the opening width of the active substance particle 110. The opening width (h) of the through holes 118 can be an average of 2.0 µm or lower, more preferably an average of 1.0 µm or lower, and further preferably an average of 0.5 µm or lower.

Moreover, characteristic values such as the above-mentioned average number of through holes and the average opening size can be understood by, for example, observing a cross section of a positive electrode active substance particle using a SEM. For example, it is possible to cut a suitable cross section in a sample obtained by fixing a positive electrode active substance particle or a material that contains the active substance particle with a suitable resin (preferably a thermosetting resin) and carry out SEM observations while gradually shaving the cut section. In addition, because it can generally be assumed that the inclination (orientation) of positive electrode active substance particles in the above-mentioned sample will be essentially random, the above-mentioned characteristic values can be calculated by subjecting results of the SEM observation on a single cut section or a relatively small number, such as 2 to 10, of cut section, to statistical processing.

A preferred positive electrode active substance particle is one in which the shell portion 115 is densely sintered in portions other than the through holes 118, as shown schematically in FIG. 5 (typically sintered to an extent whereby at least an ordinary non-aqueous electrolyte cannot pass). By using a positive electrode active substance particle 110 having this structure, locations where an electrolyte liquid can flow between the outer part of the particle 110 and the hollow portion 116 are limited to locations where through holes 118 are present. As a result, a particularly beneficial effect can be achieved with positive electrode active substance particles used in, for example, a positive electrode of a battery that includes a wound electrode body. That is, when charging and discharging is repeatedly carried out in a battery that includes a wound electrode body, an electrolyte liquid is squeezed from an electrode body (and especially from a positive electrode mixture layer) as the positive electrode active substance expands and contracts as a result of the charging and discharging. As a result, a shortage of electrolyte liquid can occur in a part of the electrode body and battery performance (for example, output performance) can deteriorate. By using a positive electrode active substance particle 110 having this structure, outflow of an electrolyte liquid from the hollow portion 116 via parts other than the through holes 118 is inhibited, meaning that shortage of electrolyte liquid in the positive electrode mixture layer can be effectively prevented or reduced. In addition, the positive electrode active substance particle 110 can exhibit high shape retention properties (that is, the particle does not readily disintegrate; reflected in, for example, high average hardness, high compressive strength and the like), and can therefore achieve high battery performance more stably.

(Particle Porosity)

The positive electrode active substance has a hollow structure (typically a perforated hollow structure) having a particle porosity of 5% or higher. The positive electrode active substance preferably has a particle porosity of 10% or higher, and more preferably 15% or higher. If the particle porosity is too low, it may be difficult to adequately realize the advantage of having a hollow structure. A particle porosity of 20% or higher (typically 23% or higher, and preferably 30% or higher) is acceptable. The upper limit of the particle porosity is not particularly limited, but from the perspectives of durability of the positive electrode active substance particle (for example, the ability to maintain a hollow form by withstanding compressive stresses that may be applied when a battery is produced or used) and ease of production, an upper limit of 95% or lower (typically 90% or lower, for example 80% or lower) is generally suitable.

The above-mentioned particle porosity can be adjusted by, for example, adjusting the time period for which a particle growth step is continued, the speed of precipitation of a transition metal hydroxide in a particle growth step (for example, the ammonia concentration) and so on in the positive electrode active substance production method that is described later.

Here, "particle porosity" means the proportion of the cross sectional area of the hollow portion to the apparent cross sectional area of the positive electrode active substance in an average cross section cut at a random position in the positive electrode active substance. This proportion can be understood by means of, for example, an SEM image of a suitable cross section in a positive electrode active substance particle or a material that contains the active substance particle. The above-mentioned cross section SEM image can be obtained by, for example, cutting a sample obtained by fixing a positive electrode active substance particle or a material that contains the active substance particle with a suitable resin (preferably a thermosetting resin) and carrying out an SEM observation of this cross section. In the cross section SEM image, it is possible to distinguish between the shell portion, the hollow portion and through holes in the positive electrode active substance particle by means of differences in color tone or shading. In the case of a plurality of positive electrode active substance particles shown in an arbitrary cross section SEM image of the above-mentioned sample, the ratio of the area ($C_V$) occupied by hollow portions in these positive electrode active substance particles and the cross section area ($C_T$) apparently occupied by these positive electrode active substance particles ($C_V/C_T$) is obtained. Here, the cross section area ($C_T$) apparently occupied by the positive electrode active substance particles means the cross section area occupied by the shell portions, hollow portions and through holes of the positive electrode active substance particles. By using this ratio ($C_V/C_T$) (that is, the particle porosity), the proportion of the volume of the hollow portions to the volume of the positive electrode active substance particles occupied by can be roughly determined.

It is preferable for an arithmetic mean value of the above-mentioned ratio ($C_V/C_T$) to be calculated using an arbitrary plurality of cross section SEM images obtained from the above-mentioned sample. The arithmetic mean value of the above-mentioned ratio ($C_V/C_T$) converges as the number of cross section SEM images used to determine this ratio ($C_V/C_T$) increases and as the number of positive electrode active substance particles, which is the basis on which this ratio ($C_V/C_T$) is calculated, increases. In general, it is preferable to determine the particle porosity using at least 10 (for example, 20 or more) positive electrode active substance particles. In addition, it is preferable to determine the particle porosity using SEM images of cross sections at at least 3 (for example, 5 or more) arbitrary locations in a sample.

(Thickness of Shell Portion)

In the positive electrode active substance having a hollow structure (positive electrode active substance particle), the thickness of the shell portion (the portion formed by primary particles aggregating in the form of a spherical shell) is preferably 3.0 µm or lower, more preferably 2.5 µm or lower (for example, 2.2 µm or lower) and further preferably 2.0 µm or lower (for example, 1.5 µm or lower). As the shell portion becomes thinner, Li ions are extracted more readily from the inner part of the shell portion (the central part in the thickness direction) during charging and Li ions are absorbed more readily into the inner part of the shell portion during discharging. Therefore, it is possible to increase the quantity of Li ions able to be s inserted and extracted per unit mass of positive electrode active substance particles under prescribed conditions, and resistance at a time when positive electrode active substance particles insert or extract Li ions can be reduced. A lithium secondary battery that uses the above-mentioned positive electrode active substance particles can achieve excellent output in low SOC regions. That is, because Li ion dispersion in solid of the positive electrode active substance is the rate-determining factor for output in low SOC regions and Li ion dispersion in solid is affected by the Li ion diffusion distance, by reducing the thickness of the shell portion of the positive electrode active substance particles, which affects the Li ion diffusion distance, it is possible to obtain excellent output characteristics in low SOC regions.

The lower limit of the thickness of the shell portion is not particularly limited, but a lower limit of approximately 0.1 μm is generally preferred. By setting the thickness of the shell portion to be 0.1 μm or higher, it is possible to ensure higher durability against stresses that may be applied when a battery is produced or used and against expansion and contraction of the positive electrode active substance, which occur as a result of charging and discharging. As a result, the performance of a lithium secondary battery can be stabilized. From the perspective of achieving both an internal resistance reduction effect and durability, the thickness of the shell portion is preferably approximately 0.1 to 2.2 μm, more preferably 0.2 to 2.0 μm, and particularly preferably 0.5 to 1.5 μm.

Here, the thickness of the shell portion 115 (see FIG. 5) means the average value of the shortest distance T(k) from an arbitrary position (k) on the inner surface 115a of the shell portion 115 (however, portions corresponding to through holes 118 are not included as the inner surface 115a) to the outer surface 115b of the shell portion 115 in a cross section SEM image of a positive electrode active substance or a material that contains the active substance particle. More specifically, it is possible to determine the above-mentioned shortest distance T(k) at a plurality of positions on the inner surface 115a of the shell portion 115 and calculate the arithmetic mean from these values. In this case, as the number of points used to determine the above-mentioned shortest distance T(k) increases, the thickness T of the shell portion 115 converges to an average value and the thickness of the shell portion 115 can be evaluated in an appropriate manner. In general, it is preferable to determine the thickness of the shell portion 115 using at least 10 (for example, 20 or more) positive electrode active substance particles 110. In addition, it is preferable to determine the thickness of the shell portion 115 using SEM images of cross sections at at least 3 (for example, 5 or more) arbitrary locations in a sample (for example, in one piece of arbitrary positive electrode active substance).

(Secondary Particles)

It is preferable for the average particle diameter (secondary particle diameter) of the positive electrode active substance particles to be, for example, approximately 2 to 25 μm. By using a positive electrode active substance having such a constitution, it is possible to achieve high battery performance more stably. If the above-mentioned average particle diameter is too low, the volume of the hollow portion is low and the battery performance improvement effect tends to deteriorate. It is more preferable for the above-mentioned average particle diameter to be approximately 3 μm or higher. In addition, from the perspectives of positive electrode active substance productivity and productivity of the positive electrode mixture layer, which is a thin film characteristic of HVs, it is preferable for the above-mentioned average particle diameter to be approximately 25 μm or lower and more preferably approximately 15 urn or lower (for example, 10 μm or lower). It is preferable for the average particle diameter of the positive electrode active substance to be approximately 3 to 10 μm (for example, 3 to 8 μm).

The above-mentioned average particle diameter of the positive electrode active substance particles can be determined as a volume-based median diameter ($D_{50}$: 50% volume-weighted mean diameter) using measurements based on a method that is publicly available in this technical field, such as a laser scattering/diffraction method. In addition, the above-mentioned average particle diameter can be adjusted by, for example, adjusting the pH in a nucleation stage, the time period for which a particle growth step is continued, the speed of precipitation of a transition metal hydroxide in a particle growth step, and so on in a positive electrode active substance production method, which is described later. The speed of precipitation of a transition metal hydroxide can be adjusted by, for example, adjusting the concentration of one or more types of chemical species related to formula 1 or formula 2, pH or the temperature of the reaction system and so on in the positive electrode active substance production method that is described later. The average particle diameter can also be adjusted by sorting particles using an ordinary sieve. Each of he above-mentioned two average particle diameter adjusting methods may be carried out per se or the two average particle diameter adjusting methods may be carried out in combination.

(Primary Particles)

With reference to FIG. 5, the primary particles 112 that constitute the positive electrode active substance particles 110 may have a length L1 of, for example, approximately 0.1 to 1.0 μm. According to the findings of the inventors of this invention, the length L1 of the primary particles 112 roughly correlates to the crystal size in a direction orthogonal to the normal direction of the (003) plane (the c axis). If the value of Li is too low, the capacity retention properties of the battery tend to deteriorate. From this type of perspective, the value of L1 is preferably 0.2 μm or higher, more preferably 0.3 μm or higher, and further preferably 0.4 μm or higher. However, if the value of L1 is too high, the distance (the Li ion diffusion distance) from the surface to the inner part (the central part in the direction of L1) of a crystal increases, meaning that diffusion of ions to the inner part of the crystal becomes slow and output characteristics (and especially output characteristics in low SOC regions) tend to deteriorate. From this type of perspective, the value of Li is preferably 0.8 μm or lower (for example, 0.75 μM or lower). The length L1 of the primary particles is preferably 0.2 to 0.8 pm (for example, 0.3 to 0.75 μm).

The length L1 of the primary particles 112 can be measured on the basis of, for example, SEM images of the surface of the positive electrode active substance particles (secondary particles) 110. With regard to the positive electrode active substance particles contained in the positive electrode mixture layer of the lithium secondary battery, when measuring the length L1 of the above-mentioned primary particles (the particle diameter $P_1$ of the primary particles), SEM observations can be made of the surface of positive electrode active substance particles that appear in a cross section obtained by cutting the mixture layer. For example, in the above-mentioned SEM image, primary particles 112 suitable for determining the length L1 are identified. That is, because a plurality of primary particles 112 appear in a SEM image of the surface of a positive electrode active substance particle (secondary particle) 110, a plurality of these primary particles 112 are extracted in descending order of display area in the above-mentioned SEM image. As a result, in the above-mentioned SEM image of the particle surface, it is possible to extract primary particles 112 whose outlines roughly conform to the longest length L1. In addition, the length of the longest axis in the extracted primary particles 112 can be used as the length L1. Moreover, in this specification, the length L1 can also mean the primary particle diameter $P_1$ of the positive electrode active substance.

(Crystallinity)

In the positive electrode active substance, the lamination pattern of transition metal layers is arbitrary. That is, in cases where there are no interactions in the direction of lamination, transition metal layers are laminated in a random manner, but in cases where interactions occur in the direction of lamination, it is thought that, a layered structure having a regular lamination pattern can be obtained. In this case, it is thought that the degree of irregularity or regularity in the direction of lamination can be understood by comparing the shape of a diffraction peak of the (003) plane, which appears at a diffraction angle (2θ) of 17 to 20° when carrying out X-ray diffraction measurements using a Cu tube, with the shape of a diffraction peak of the (104) plane, which appears at a diffraction angle (2θ) of 43 to 46°. That is, in cases where the shape of a diffraction peak of the (104) plane relative to the shape of a diffraction peak of the (003) plane is quantified by using the SF value, that is, in cases where the (104) plane/(003) plane integral width ratio is quantified, the SF value tends to be high when there is a high degree of regularity in the direction of lamination, and it is thought that the degree of regularity in the direction of lamination is optimal when the SF value satisfies the relationship 1.0 SF 2.6. In the case of a sample in which the above-mentioned SF value and the degree of regularity in the direction of lamination are high and interactions in the direction of lamination are great, the speed of diffusion of Li ions into the solid body increases, output characteristics in low SOC regions are improved and the layered structure is stabilized even in an oxide from which Li ions have been extracted, and it is therefore thought that a positive electrode material having excellent durability to charging and discharging can be obtained. It is thought that interactions in the direction of lamination are insufficient in cases where the SF value is lower than 1.0, and that if the SF value exceeds 2.6, interactions in the direction of lamination are too strong and the transport of Li ions into the solid body is inhibited. This SF value is more preferably 1.3 or higher and further preferably 1.5 or higher, and is further preferably 2.4 or lower (for example, 2.2 or lower).

The method for measuring the crystallinity SF value is not particularly limited, but can be carried out by subjecting a sample to powder X-ray diffraction measurements. The measurements can be carried out using an X-ray diffraction apparatus (RINT 2200 manufactured by Rigaku Corporation) using CuKα radiation (wavelength 0.154051 nm) as a radiation source. It is possible to carry out the measurements by using a graphite single crystal monochromator to monochromatize the X-rays and setting the applied voltage to be 40 kV and the current to be 30 mA. In addition, it is preferable for the measurements to be carried out at a scanning rate of 3°/min and a diffraction angle (2θ) of 10 to 100°. When carrying out X-ray diffraction measurements using a Cu tube, it is possible to calculate the SF value $(R_H/R_I)$ from the integral intensity ratio $R_I$ $(I_A/I_B)$ and peak intensity ratio $R_H$ $(H_A/H_B)$ of a diffraction peak A that appears at a diffraction angle (2θ) of 17 to 20° and a diffraction peak B that appears at a diffraction angle (2θ) of 43 to 46°.

(Specific Surface Area)

It is preferable for the BET specific surface area of the positive electrode active substance to be approximately 0.3 $m^2/g$ or higher, more preferably 0.5 $m^2/g$ or higher, and further preferably 0.8 $m^2/g$ or higher. In addition, the BET specific surface area of the positive electrode active substance particles 110 can be, for example, approximately 3.0 $m^2/g$ or lower (for example 2.0 $m^2/g$ or lower), and is preferably 1.7 $m^2/g$ or lower and more preferably 1.5 $m^2/g$ or lower. It is preferable for the BET specific surface area of the positive electrode active substance to be approximately 0.5 to 2.0 $m^2/g$.

(Hardness of Positive Electrode Active Substance)

According to a preferred embodiment of this invention, positive electrode active substance particles having an average hardness of approximately 0.5 MPa or higher (typically 1.0 MPa or higher, for example 2.0 to 10 MPa) can be produced. Here, "average, hardness" means a value obtained by carrying out dynamic microhardness measurements using a flat diamond indenter having a diameter of 50 μm at a loading rate of 0.5 to 3 mN/sec. The above-mentioned dynamic microhardness measurements can be carried out using, for example, a "MCT-W500" microhardness gauge manufactured by Shimadzu Corporation. By carrying out the above-mentioned hardness measurements on a larger number of positive electrode active substance particles, the arithmetic mean value for the hardness of these positive electrode active substance particles converges. The above-mentioned average hardness is preferably an arithmetic mean value obtained using at least 3 (and preferably 5 or more) positive electrode active substance particles. The positive electrode active substance production method described later, which includes a nucleation stage and a crystal growth stage, is preferred as a method for producing a positive electrode active substance having the above-mentioned average hardness. Positive electrode active substance particles having a perforated hollow structure obtained by means of the positive electrode active substance production method described below can exhibit higher hardness (higher average hardness) and better morphological stability than positive electrode active substance particles having an ordinary porous structure obtained by, for example, a spray baking production method (also referred to as a spray drying production method). As a result, positive electrode active substance particles having a hollow structure and a high average hardness (that is, high shape retention properties) can give a battery that stably exhibits high performance.

<Method for Producing Positive Electrode Active Substance>

The method for producing the positive electrode active substance includes, for example, a raw material hydroxide production step, a mixing step and a firing step. The raw material hydroxide production step is a step in which ammonium ions are supplied to a water-based solution of a transition metal compound so as to precipitate particles of a transition metal hydroxide from the water-based solution. Here, the water-based solution contains at least one transition metal element that constitutes the lithium transition metal oxide. The above-mentioned raw material hydroxide production step preferably includes a nucleation stage, in which a transition metal hydroxide is precipitated from the water-based solution, and a particle growth stage, in which the transition metal hydroxide is grown under conditions in which the pH of the water-based solution is reduced to a value that is lower than the pH in the nucleation stage. The mixing step is a step in which an unfired mixture is prepared by mixing the transition metal hydroxide and a lithium compound. The firing step is a step in which the positive electrode active substance is obtained by firing the mixture. Furthermore, it is preferable to pulverize and sieve the fired product following the firing.

The positive electrode active substance production method will now be explained in greater detail. The positive electrode active substance of this embodiment (typically positive electrode active substance particles having a perforated hollow structure) can be produced using a method including, for example, precipitating a hydroxide of a transition metal under suitable conditions from a water-based solution that contains at least one type of transition metal element contained in the lithium transition metal oxide (and preferably all of the metallic elements other than lithium contained in the oxide) that constitutes the active substance, and then firing a mixture of this transition metal hydroxide and a lithium compound.

In addition, one embodiment of the above-mentioned positive electrode active substance production method will be explained in detail using positive electrode active substance particles which have a perforated hollow structure and which are formed by a LiNiCoMn oxide having a layered structure as an example, but the scope of this production method is not limited to a positive electrode active substance (typically positive electrode active substance particles having a perforated hollow structure) having the above-mentioned composition. Unless indicated otherwise, the positive electrode active substance production method is not limited to the production method disclosed here.

(Raw Material Hydroxide Production Step)

The positive electrode active substance production method includes a step (a raw material hydroxide production step) in which ammonium ions ($NH_4^+$) are supplied to a water-based solution of a transition metal compound so as to precipitate particles of a transition metal hydroxide from the water-based solution. The solvent (water-based solvent) that constitutes the above-mentioned water-based solution is typically water, but may be a mixed solvent having water as the main component. Preferred examples of solvents other than water that constitute this mixed solvent include organic solvents able to be homogeneously mixed with water (lower alcohols and the like). Depending on the composition of the lithium transition metal oxide that constitutes the target positive electrode active substance particles, the above-mentioned water-based solution of a transition metal compound (hereinafter also referred to as a "transition metal solution") contains at least one transition metal element $M_T$ that constitutes the lithium transition metal oxide (here, $M_T$ denotes Ni, Co and Mn) (and preferably contains each of Ni, Co and Mn). For example, a transition metal solution that contains one or more compounds able to supply Ni ions, Co ions and Mn ions to the water-based solvent is used. Compounds that are sources of these metal ions can be sulfates, nitrates, chlorides and the like of the metals. For example, a transition metal solution having a composition obtained by dissolving nickel sulfate, cobalt sulfate and manganese sulfate in a water-based solvent (preferably water) can be preferably used.

The above-mentioned $NH_4^+$ ions can be supplied to the above-mentioned transition metal solution in the form of, for example, a water-based solution (typically an aqueous solution) that contains $NH_4^+$ ions or by directly blowing ammonia gas into the transition metal solution, or by using these supply methods in combination. The water-based solution that contains $NH_4^+$ ions can be prepared by, for example, dissolving a compound that becomes a source of $NH_4^+$ ions (ammonium hydroxide, ammonium nitrate, ammonia gas and the like) in a water-based solvent. In this embodiment, $NH_4^+$ ions are supplied in the form of an aqueous solution of ammonium hydroxide (that is, aqueous ammonia).

(Nucleation Stage)

The above-mentioned raw material hydroxide production step may include a stage (a nucleation stage) in which a transition metal hydroxide is precipitated from the above-mentioned transition metal solution under conditions of a pH of 12 or higher (typically not lower than 12 and not higher than 14, for example not lower than 12.2 and not higher than 13) and an $NH_4^+$ ion concentration of 25 g/L or lower (typically 3 to 25 g/L). The above-mentioned pH and $NH_4^+$ ion concentration can be adjusted by appropriately adjusting the usage quantities of the above-mentioned aqueous ammonia and an alkaline agent (a compound that has the effect of rendering liquid properties alkaline). The alkaline agent can be, for example, sodium hydroxide or potassium hydroxide, which are typically used in the form of an aqueous solution. In this embodiment, an aqueous solution of sodium hydroxide is used. Moreover, in this specification, pH values are pH values at a liquid temperature of 25° C.

(Particle Growth Stage)

The above-mentioned raw material hydroxide production step may include a stage (a particle growth stage) in which nuclei (typically particles) of the transition metal hydroxide precipitated in the above-mentioned nucleation stage are grown at a pH of lower than 12 (typically not lower than 10 but lower than 12 and preferably not lower than 10 and not higher than 11.8, for example not lower than 11 and not higher than 11.8) and an $NH_4^+$ ion concentration of 1 g/L or higher, and preferably 3 g/L or higher (typically 3 to 25 g/L). In general, the pH in the crystal growth stage should be 0.1 or more (typically 0.3 or more and preferably 0.5 or more, for example 0.5 to 1.5) lower than the pH in the nucleation stage.

The above-mentioned pH and $NH_4^+$ ion concentration can be adjusted in the same way as in the nucleation stage. When carrying out this crystal growth stage in such a way as to satisfy the above-mentioned pH and $NH_4^+$ ion concentration, it is preferable to set the $NH_4^+$ ion concentration to be 20 g/L or lower (for example, 1 to 20 g/L, typically 3 to 20 g/L) and more preferably 15 g/L or lower (for example, 1 to 15 g/L, typically 3 to 10 g/L) at the above-mentioned pH in order to increase the speed of precipitation of the transition metal hydroxide (here, a complex hydroxide that contains Ni, Co and Mn) and produce raw material hydroxide particles suitable for forming the positive electrode active substance of this embodiment (typically positive electrode active substance particles having a perforated hollow structure) that is, produce raw material hydroxide particles able to readily form a fired product having a perforated hollow structure.

The above-mentioned $NH_4^+$ ion concentration can be 7 g/L or lower (for example, 1 to 7 g/L, and more preferably 3 to 7 g/L). The $NH_4^+$ ion concentration in the particle growth stage can be, for example, approximately the same as the $NH_4^+$ ion concentration in the nucleation stage or lower than the $NH_4^+$ ion concentration in the nucleation stage. Moreover, the speed of precipitation of the transition metal hydroxide can be understood by, for example, monitoring changes in the total number of moles of transition metal ions in the liquid phase of the reaction liquid (the total ion concentration) relative to the total number of moles of transition metal ions in the transition metal solution supplied to the reaction liquid.

In the nucleation stage and the particle growth stage, it is preferable to control the temperature of the reaction liquid to an almost constant temperature (for example, a prescribed temperature ±1° C.) within the range 30 to 60° C. The temperature of the reaction liquid may be similar in the nucleation stage and the particle growth stage. In addition, it is preferable to maintain a non-oxidizing atmosphere for the reaction liquid and the atmosphere in the reaction vessel throughout the nucleation stage and the particle growth stage. In addition, the total number of moles of Ni ions, Co ions and Mn ions (the total ion concentration) in the reaction liquid can be approximately 0.5 to 2.5 mol/L, and preferably approximately 1.0 to 2.2 mol/L, throughout the nucleation stage and the particle growth stage. In order to maintain the above-mentioned total ion concentration, the transition metal solution may be supplemented (typically continuously supplied) according to the rate of precipitation of the transition metal hydroxide. The quantities of Ni ions, Co ions and Mn ions in the reaction liquid are preferably in a ratio that corresponds to the composition of the target positive electrode active substance particle (that is, the molar ratio of Ni, Co and Mn in the LiNiCoMn oxide that constitutes the active substance particles).

(Mixing Step)

In this embodiment, the transition metal hydroxide particles produced using the above-mentioned method (complex hydroxide particles containing Ni, Co and Mn in this case) are separated from the reaction liquid, washed and dried. These transition metal hydroxide particles and a lithium compound are mixed at a desired ratio so as to prepare an unfired mixture (the mixing step). In this mixing step, the Li compound and the transition metal hydroxide particles are generally mixed at a ratio corresponding to the composition of the target positive electrode active substance particles (that is, the molar ratio of Li, Ni, Co and Mn in the LiNiCoMn oxide that constitutes the active substance particles). A Li compound able to form an oxide when melted by heating, for example lithium carbonate or lithium hydroxide, can be preferably used as the above-mentioned lithium compound.

(Firing Step)

Next, positive electrode active substance particles are obtained by firing the above-mentioned mixture (the firing step). This firing step is typically carried out in an oxidizing atmosphere (for example, in air (an air atmosphere)). The firing temperature in this firing step can be, for example, 700 to 1100° C. The maximum firing temperature is preferably 800° C. or higher (and preferably 800 to 1100° C., for example 800 to 1050° C.). By setting the maximum firing temperature to fall within this range, a sintering reaction of primary particles of the lithium transition metal oxide (preferably a Ni-containing Li oxide, and a LiNiCoMn oxide in this case) progresses satisfactorily.

A preferred example can include a first firing stage, in which the above-mentioned mixture is fired at a temperature T1 of not lower than 700° C. and not higher than 900° C. (that is, 700° C.≤T1≤900° C., for example 700° C.≤T1≤800° C., and typically 700° C.≤T1≤800° C.), and a second firing stage, in which the fired product obtained in the first firing stage is fired at a temperature T2 of not lower than 800° C. and not higher than 1100° C. (that is, 800° C.≤T2≤1100° C., for example 800° C.≤T2≤1050° C.). As a result, positive electrode active substance particles having a perforated hollow structure can be formed with good efficiency. It is preferable to set T1 and T2 so that T1<T2.

The first firing stage and second firing stage may be continuous (for example, it is possible to hold the above-mentioned mixture at the first firing temperature T1, then increase the temperature to the second firing temperature T2, and then hold the above-mentioned mixture at the temperature T2), but it is also possible to hold the above-mentioned mixture at the first firing temperature T1, then cool the above-mentioned mixture (for example, cool to normal temperature), pulverize and sieve if necessary and then supplying the cooled fired product to the second firing stage.

Moreover, it can be understood that the above-mentioned first firing stage is a stage in which a sintering reaction of the target lithium transition metal oxide progresses and firing is carried out at a temperature T1, which is not higher than the melting point of the lithium transition metal oxide and which is lower than the temperature in the second firing stage. In addition, it can be understood that the above-mentioned second firing stage is a stage in which a sintering reaction of the target lithium transition metal oxide progresses and firing is carried out at a temperature T2, which is not higher than the melting point of the lithium transition metal oxide and which is higher than the temperature in the first firing stage. It is preferable for the difference between T1 and T2 to be 50° C. or more (typically 100° C. or more, for example 150° C. or more).

In addition, in order to stably obtain a thin positive electrode active substance in which the proportion of the cross sectional area of the positive electrode active substance occupied by the hollow portion to the entire apparent cross sectional area of the positive electrode active substance is 15% or higher (more preferably 20% or higher, and further preferably 23% or higher) and the thickness of the shell portion of the positive electrode active substance is 3.0 μm or lower (more preferably 2.2 μm or lower), the pH or $NH_4^+$ ion concentration in the stage in which the transition metal hydroxide is precipitated from the transition metal solution (the nucleation stage) and the pH or $NH_4^+$ ion concentration in the stage in which nuclei of the transition metal hydroxide precipitated in the nucleation stage are grown (the particle growth stage) can be adjusted as appropriate.

It is thought that the reason why a precursor hydroxide suitable for forming a positive electrode active substance having a hollow structure (preferably a perforated hollow structure) can be obtained by suppressing the concentration of ammonia in the particle growth stage to a low value in this way is as follows.

In the above-mentioned mixed solution (reaction liquid), an equilibrium reaction such as that shown below takes place. In formulae 1 and 2 below, M1 is a transition metal (for example, Ni).

$$M_1^{2+} + 6NH_3 \rightleftarrows [M_1(NH_3)_6]^{2+} \quad \text{(formula 1)}$$

$$M_1^{2+} + 2OH^- \rightleftarrows M_1(OH)_2 \quad \text{(formula 2)}$$

Here, by reducing the ammonia concentration in the reaction liquid, the equilibrium in formula 1 shifts to the left and the concentration of $M_1^{2+}$ increases, meaning that the equilibrium in formula 2 shifts to the right and the generation of $M_1(OH)_2$ is facilitated. That is, $M_1(OH)_2$ is readily precipitated. Under such conditions where $M_1(OH)_2$ is readily precipitated, the precipitation of $M_1(OH)_2$ occurs mainly on the outer surface of the already precipitated transition metal hydroxide and in the vicinity of the outer surface thereof (the nuclei generated in the above-mentioned nucleation stage or the transition metal hydroxide particles that grow in the particle growth stage), and the quantity of $M_1(OH)_2$ precipitated in the inner parts of the above-mentioned precipitates is low. As a result, it is thought that precursor hydroxide particles having a structure in which the density of the inner part of the particle is lower than the density of the outer surface part (particles understood to be transition metal hydroxide particles suitable for forming positive electrode active substance particles having a hollow structure, that is, precursor particles of the active substance particles) are formed.

When mixed with the lithium compound and fired, the precursor hydroxide particles having this type of structure can be sintered so that the inner part of the particles, which has a low density, is surrounded by the outer surface vicinity part, which has a high density and high mechanical strength. As a result, the shell portion 115 of the positive electrode active substance particle 110 is formed and a large hollow portion 116 is also formed, as shown in FIG. 5. Furthermore, when crystals grow during sintering, a through hole 118 that penetrates the shell portion 115 is formed in a part of the shell portion 115. As a result, it is thought that a positive electrode active substance particle 110 having the shell portion 115, the hollow portion 116 and the through hole 118 is formed. However, if the ammonia concentration in the particle growth stage is too high, it is thought that the speed of precipitation of the $M_1(OH)_2$ is too low, meaning that the difference between the quantity precipitated on the outer surface of the already precipitated transition metal hydroxide and in the vicinity thereof in the inner part is too small and precursor hydroxide particles having the above-mentioned structure are hardly formed.

In addition, in cases where the positive electrode active substance contains one or more elements $M_A$ and $M_B$ (for example, W, Cr, Mo, Zr, Mg, Ca, Na, Fe, Zn, Si, Sn, Al, B and F) as additional constituent elements (added elements) in addition to $M_T$ (that is, at least one of Ni, Co and Mn), the positive electrode active substance can be prepared by firing a mixture that contains a precursor hydroxide which contains $M_T$, a compound which contains at least one of $M_A$ and $M_B$, and a lithium compound (a dry mixing method). Alternatively, the positive electrode active substance can also be prepared by firing a mixture of a precursor hydroxide, which has a composition that contains $M_T$ at least one of $M_A$ and $M_B$, and a lithium compound. In this embodiment, the preferred method is to fire a mixture of a precursor hydroxide, which has a composition that contains $M_T$ and at least one of $M_A$ and $M_B$, and a lithium compound. The above-mentioned precursor hydroxide that contains $M_T$ and at least one of $M_A$ and $M_B$ can be preferably prepared by, for example, generating the precursor hydroxide from a reaction liquid that contains these components (a wet method (a co-precipitation method)). In this case, it is possible to obtain a positive electrode active substance in which localized aggregation is prevented in the distribution of $M_A$ and $M_B$ in the positive electrode active substance. For example, it is possible to obtain a positive electrode active substance in which the elements $M_A$ and $M_B$ are more uniformly present throughout the positive electrode active substance or on the surface of primary particles of the active substance than in a positive electrode active substance obtained using the above-mentioned dry mixing method. The quantities of $M_A$ and $M_B$ should be in a ratio that roughly corresponds to the composition of the target positive electrode active substance particles (that is, the molar ratio of $M_A$ and $M_B$ in the active substance particles).

Moreover, the positive electrode may contain another publicly available positive electrode active substance (for example, a positive electrode active substance having no hollow portions) as a positive electrode active substance in addition to the above-mentioned positive electrode active substance having a hollow structure. However, because the effect of this invention can solve the problem by using the above-mentioned positive electrode active substance having a hollow structure, the proportion of the other publicly available positive electrode active substances is preferably 50 mass % or less (for example, 30 mass % or less, and typically 10 mass % or less) of the overall positive electrode active substance. The positive electrode active substance can substantially be formed by the above-mentioned positive electrode active substance having a hollow structure.

<Additives>

In addition to the positive electrode active substance, the positive electrode mixture layer can contain additives such as electrically conductive materials and binders if necessary. Electrically conductive carbon materials such as carbon powders or carbon fibers can be advantageously used as the electrically conductive materials. Preferred examples of carbon powders include a variety of types of carbon black, for example acetylene black, furnace black, ketjen black and graphite powder. In addition, it is possible to incorporate electrically conductive fibers such as carbon fibers or metal fibers, powders of metals such as copper or nickel and organic electrically conductive materials such as polyphenylene derivatives, either singly or in combination.

A variety of polymeric materials can be used as binders. For example, when forming a positive electrode mixture layer by using a water-based composition (a composition in which water or a mixed solvent having water as the main component is used as a dispersion medium for the positive electrode active substance particles), a polymeric material able to be dissolved or dispersed in water (water-soluble or water-dispersible) can be preferably used as a binder. Examples of water soluble or water-dispersible polymeric materials include cellulose-based polymers such as carboxymethyl cellulose (CMC); poly(vinyl alcohol) (PVA); fluorine-based resins such as polytetrafluoroethylene (PTFE); a vinyl acetate-based polymer; and rubbers such as styrene-butadiene rubbers (SBR) and acrylic acid-modified SBR resins (SBR-based latexes).

Alternatively, when forming a positive electrode mixture layer by using a solvent-based composition (a composition in which the dispersion medium for the positive electrode active substance particles is primarily an organic solvent), it is possible to use a polymeric material such as a halogenated vinyl resin such as poly(vinylidene fluoride) (PVDF) or poly(vinylidene chloride) (PVDC); or a poly(alkylene oxide) such as poly(ethylene oxide) (PEO). This type of binder may a single binder or a combination of two or more types thereof. Moreover, in addition to being used as binders, the polymeric materials listed above can be used as thickening agents for compositions for forming positive electrode mixture layers or other types of additive.

<Blending Proportions>

The proportion of the positive electrode active substance in the positive electrode mixture layer is generally greater than approximately 50 mass %, and preferably approximately 70 to 97 mass % (for example, 75 to 95 mass %). In addition, the proportion of these additives in the positive electrode mixture layer is not particularly limited, but the proportion of electrically conductive materials is preferably approximately 2 to 20 mass % (for example, 3 to 18 mass %), and the proportion of binders is preferably approximately 1 to 10 mass % (for example, 2 to 7 mass %).

<Method for Producing Positive Electrode>

The method for producing a positive electrode such as that described above is not particularly limited, and it is possible to use a conventional method as appropriate. For example, the positive electrode can be produced using the following method. First, the positive electrode active substance and, if necessary, electrically conductive materials and binders and the like are mixed in an appropriate solvent (a water-based solvent, a non-water-based solvent or a mixture thereof) so as to prepare a paste-like or slurry-like composition for forming a positive electrode mixture layer. The mixing can be carried out using a suitable mixer (a planetary mixer, homodisper, Clearmix, Filmix and the like). The solvent used to prepare the above-mentioned composition can be a water-based solvent or a non-water-based solvent. Water-based solvents should, on the whole, exhibit aqueous properties, and water or a mixed solvent having water as the main component can be preferably used. Preferred examples of non-water-based solvents include N-methyl-2-pyrrolidone (NMP), methyl ethyl ketone, toluene and the like.

The above-mentioned composition prepared in this way is coated on a positive electrode current collector, dried so as to evaporate off the solvent, and then pressed. The method used to coat the above-mentioned composition on the positive electrode current collector can be a method similar to publicly available methods. For example, the composition can be advantageously coated on the positive electrode current collector by using a suitable coating device such as a slit coater, die coater, gravure coater or comma coater. In addition, the solvent can be satisfactorily dried by means of natural drying, a hot air flow, a low humidity air flow, a vacuum, infrared radiation, far infrared radiation, an electron beam or a combination thereof. Furthermore, the pressing method can be a publicly available roll pressing method, flat plate pressing method and the like. In order to adjust the thickness, the thickness is measured using a film thickness-measuring device, the pressure is adjusted, and pressing is carried out a plurality of times until the desired thickness is reached. As a result, it is possible to obtain a positive electrode in which the positive electrode mixture layer is formed on the positive electrode current collector.

The coating weight per unit area of the positive electrode mixture layer on the positive electrode current collector (the coated quantity in terms of solid content of the composition for forming a positive electrode mixture layer) is not particularly limited, but from the perspective of ensuring a sufficient electrically conductive path (conduction path), the coating weight on each side of the positive electrode current collector is preferably 3 mg/cm$^2$ or higher (for example, 5 mg/cm$^2$ or higher, and typically 6 mg/cm$^2$ or higher) and 45 mg/cm$^2$ or lower (for example, 28 mg/cm$^2$ or lower, and typically 15 mg/cm$^2$ or lower). The density of the positive electrode mixture layer is not particularly limited, but is preferably 1.0 to 3.8 g/cm$^3$ (for example 1.5 to 3.0 g/cm$^3$, and typically 1.8 to 2.4 g/cm$^3$).

<<Negative Electrode>>

As in a conventional lithium secondary battery, the negative electrode current collector that constitutes the negative electrode (typically a negative electrode sheet) is preferably an electrically conductive member formed by a metal having high electrical conductivity. This type of electrically conductive member can be, for example, copper or an alloy containing copper as the main component. The shape of the negative electrode current collector is not particularly limited due to being able to differ according to the shape of a battery and the like, and can be rod-like, plate-like, sheet-like, foil-like, mesh-like and so on. The thickness of the negative electrode current collector is also not particularly limited, and can be approximately 5 to 30 μm.

<Negative Electrode Mixture Layer>

The negative electrode mixture layer contains a negative electrode active substance able to insert and extract Li ions, which act as charge carriers. The composition and form of the negative electrode active substance are not particularly limited, and it is possible to use one or more types of substance used in the past in lithium secondary batteries. Examples of this type of negative electrode active substance include carbon materials commonly used in lithium secondary batteries. Typical examples of the above-mentioned carbon materials include graphite carbon and amorphous carbon. It is preferable to use a particulate carbon material (carbon particles) having a graphite structure (a layered structure) in at least a part of the carbon material. Of these, it is preferable to use a carbon material that contains natural graphite as the primary component. The above-mentioned natural graphite can be obtained by conglobating flaky graphite. In addition, it is possible to use a carbonaceous powder obtained by coating the surface of graphite with amorphous carbon. In addition, an oxide such as lithium titanate, an elemental substance, alloy or compound of a silicon material or a tin material or a composite material using a combination of the above-mentioned materials can also be used as the negative electrode active substance. The proportion of the negative electrode active substance in the negative electrode mixture layer is generally greater than approximately 50 mass %, and preferably approximately 90 to 99 mass % (for example, 95 to 99 mass %, and typically 97 to 99 mass %).

In addition to the negative electrode active substance, the negative electrode mixture layer can, if necessary, contain one or more binders, thickening materials and other additives able to be blended in negative electrode mixture layers of conventional lithium secondary batteries. A variety of polymeric materials can be used as binders. For example, polymeric materials able to be incorporated in the positive electrode mixture layer can be preferably used in a water-based composition or solvent-based composition. In addition to being used as binders, such binders can be used as thickening agents for compositions for forming negative electrode mixture layers or other types of additive. The proportion of these additives in the negative electrode mixture layer is not particularly limited, but is preferably approximately 0.8 to 10 mass % (for example, approximately 1 to 5 mass %, and typically 1 to 3 mass %).

The method for producing the negative electrode is not particularly limited, and it is possible to use a conventional method as appropriate. For example, the negative electrode can be produced using the following method. First, the negative electrode active substance is mixed with a binder and the like in the above-mentioned suitable solvent (a water-based solvent, an organic solvent or a mixture thereof) so as to prepare a paste-like or slurry-like composition for forming a negative electrode mixture layer. The above-mentioned composition prepared in this way is coated on a negative electrode current collector, dried so as to evaporate off the solvent and then pressed. As a result, it is possible to form the negative electrode mixture layer on the negative electrode current collector by using the above-mentioned composition and it is possible to obtain a negative electrode that includes the negative electrode mixture layer. Moreover, the methods used for mixing, coating, drying and pressing can be similar to those used to produce the above-mentioned positive electrode.

The coating weight per unit area of the negative electrode mixture layer on the negative electrode current collector (the coated quantity in terms of solid content of the composition for forming a negative electrode mixture layer) is not particularly limited, but from the perspective of ensuring a sufficient electrically conductive path (conduction path), the coating weight on each side of the negative electrode current collector is preferably 2 mg/cm$^2$ or higher (for example, 3 mg/cm$^2$ or higher, and typically 4 mg/cm$^2$ or higher) and 40 mg/cm$^2$ or lower (for example, 22 mg/cm$^2$ or lower, and typically 10 mg/cm$^2$ or lower). The density of the negative electrode mixture layer is not particularly limited, but is preferably 0.5 to 3.0 g/cm$^3$ (for example 0.7 to 2.0 g/cm$^3$, and typically 0.8 to 1.4 g/cm$^3$).

<<Capacity Ratio of Positive Electrode and Negative Electrode>>

Although not particularly limited, the ratio of the initial charging capacity of the positive electrode ($C_P$) and the initial charging capacity of the negative electrode ($C_N$) ($C_N/C_P$) is generally 1.1 to 2.1, and preferably 1.2 to 2.0. If the $C_N/C_P$ ratio is too low, problems such as metallic lithium being readily precipitated can occur depending on the usage conditions of the battery (for example, during rapid charging and the like). If the $C_N/C_P$ ratio is too high, the energy density of the battery can be reduced.

<<Separator>>

A separator (a separator sheet) that is disposed so as to separate the positive electrode from the negative electrode should be a member which insulates the positive electrode mixture layer from the negative electrode mixture layer and which allows the movement of an electrolyte. The above-mentioned separator can be similar to a sheet used as a separator in a conventional lithium secondary battery. For example, a sheet constituted mainly from a thermoplastic resin such as a polyolefin (PE, PP and the like), a polyester or a polyamide can be preferably used. A preferred example is a sheet having a single layer or multilayer structure and constituted mainly from one or more polyolefin-based resins (a polyolefin-based sheet). For example, a PE sheet, a PP sheet or a sheet having a three layer structure obtained by laminating a PP layer on both sides of a PE layer (a PP/PE/PP structure) can be advantageously used. The above-mentioned PE can be any of the types of PE commonly referred to as high density polyethylene (HDPE), low density polyethylene (LDPE) or straight chain (linear) low density polyethylene (LLDPE), or a mixture thereof. In addition, the above-mentioned separator may, if necessary, contain a variety of additives such as plasticizers and antioxidants.

The separator is preferably a porous sheet produced from a thermoplastic resin (for example, a polyolefin resin) in which the shut down temperature is set to be 80 to 140° C. (for example, 110 to 140° C., and typically 120 to 135° C.). The above-mentioned shut down temperature is sufficiently lower than the heat resistance temperature of the battery (typically approximately 200° C. or higher), and can therefore exhibit a shut down function with suitable timing. In addition, even if the separator undergoes thermal shrinkage or perforation at the shut down temperature or a temperature higher than this, because the heat-resistant barrier layer is provided between the positive and negative electrodes (typically between the positive electrode and the separator), it is possible to maintain a suitable degree of insulation between the positive and negative electrodes.

For example, a monoaxially or biaxially stretched porous resin film can be advantageously used as a resin layer that constitutes a separator having a single layer or multilayer structure. Of these, a porous resin film that has been monoaxially stretched in the longitudinal direction is particularly preferred due to having satisfactory strength while undergoing little thermal shrinkage in the width direction. By using a separator having a monoaxially stretched porous resin film, it is also possible to suppress thermal shrinkage in the longitudinal direction of a wound electrode body obtained by winding the separator together with long sheet-like positive and negative electrodes. Therefore, a porous resin film that has been monoaxially stretched in the longitudinal direction is particularly preferred as an element of a separator that constitutes the above-mentioned wound electrode body.

It is preferable for the porosity of the separator to be approximately 20 to 60%, and more preferably approximately 30 to 50%. If the porosity of the separator is too high, the strength of the separator may be insufficient and significant thermal shrinkage may occur. However, if the above-mentioned porosity is too low, the quantity of electrolyte liquid able to be held in the separator is too low, ion conductivity deteriorates and high rate charging and discharging characteristics tend to deteriorate. Moreover, the porosity of the separator can be calculated using the following method. The apparent volume occupied by a unit area (surface area) of the separator is referred to as V1 (cm$^3$), and the mass of the above-mentioned unit area of separator is referred to as W (g). The ratio of this mass W to the true density ρ (g/cm$^3$) of the resin material that constitutes the above-mentioned separator, that is, W/ρ, is referred to as V0. Moreover, V0 is the volume occupied by a solid body of the resin material having the mass W. The porosity of the separator can be calculated from [(V1−V0)/V1]×100. The porosity of the separator can be adjusted by altering the material of the resin layer, the drawing strength and the like.

If the average porosity of the separator is too low, ion conductivity decreases and high rate charging and discharging characteristics tend to deteriorate. If the above-mentioned average porosity is too high in cases where a heat-resistant barrier layer, which is described later, is formed on the separator, a filler that constitutes the heat-resistant barrier layer becomes excessively incorporated in pores of the separator and ion conductivity and high rate charging and discharging characteristics tend to deteriorate. There is a correlation between the average pore diameter and the air permeability of the separator, and by regulating this air permeability, it is possible to pseudo-regulate the average pore diameter. Here, "air permeability" means air permeation resistance (Gurley) and can be measured using the method specified in JIS P 8117. A separator in which the above-mentioned air permeability (Gurley value) is 100 to 1000 sec/100 mL (for example, 200 to 600 sec/100 mL) can be preferably used.

The thickness of the separator is not particularly limited, but is preferably 5 to 40 μm (for example, 10 to 30 μm, and typically 15 to 25 μm). If the thickness of the separator falls within the above-mentioned range, the ion conductivity of the separator increases and rupture of the separator hardly occurs. Moreover, the thickness of the separator can be determined by analyzing images taken with a SEM.

<<Heat-Resistant Barrier Layer>>

A heat-resistant barrier layer disposed between the positive electrode and the negative electrode can be a layer having the property of, for example, retaining shape without softening or melting (although slight deformation is permitted) even under conditions of high temperature caused by the battery generating heat (for example, at a temperature of 150° C. or higher, and typically 300° C. or higher). Moreover, when forming the heat-resistant barrier layer on the separator, the heat-resistant barrier layer can have a higher softening point or melting point than the separator.

(Filler)

The filler that can be the main component of the above-mentioned heat-resistant barrier layer can be an organic filler or an inorganic filler, but from the perspectives of heat resistance, dispersibility and stability, is preferably an inorganic filler. The inorganic filler is not particularly limited, but can be, for example, an inorganic oxide such as alumina, boehmite, silica, titania, zirconia, calcia, magnesia or iron oxide, an inorganic nitride such as aluminum nitride, a carbonate such as magnesium carbonate, a sulfate such as barium sulfate, a chloride such as magnesium chloride, a fluoride such as barium fluoride, covalent crystals of silicon and the like, a mineral-based material such as talc, a clay, mica, bentonite, montmorillonite, a zeolite, apatite, kaolin, mullite or sericite, or artificial products of these mineral-based materials. These fillers may be used singly or as a combination of two or more types thereof. Of these, for reasons such as high electrochemical stability and excellent heat resistance and mechanical strength, alumina, boehmite, silica, titania, zirconia, calcia and magnesia are preferred, and boehmite and alumina are particularly preferred.

The form of the filler is not particularly limited, and can be, for example, particulate, fibrous, plate-like (flaky) and so on. The average particle diameter of the filler is not particularly limited, but from perspectives such as dispersibility, should be, for example, 0.1 to 15 μm (for example, 0.1 to 5 μm, and typically 0.2 to 1.5 μm). The above-mentioned $D_{50}$ value can be used as the average particle diameter of the filler.

(Additives)

It is preferable for the heat-resistant barrier layer to contain an additive such as a binder. In cases where the composition for forming the heat-resistant barrier layer is a water-based solvent (a solution that uses water or a mixed solvent having water as the main component, the water or the mixed solvent being used as a dispersion medium for a binder), the binder can be a polymer able to be dispersed or dissolved in a water-based solvent. The polymer able to be dispersed or dissolved in a water-based solvent can be, for example, an acrylic resin. Preferred examples of acrylic resins include homopolymers obtained by polymerizing a single type of monomer, such as acrylic acid, methacrylic acid, acrylamide, methacrylamide, 2-hydroxyethyl acrylate, 2-hydroxyethyl methacrylate, methyl methacrylate, 2-ethylhexyl acrylate and butyl acrylate. Alternatively, it is possible to use a copolymer obtained by polymerizing two or more of the above-mentioned monomers. Furthermore, it is possible to use a mixture of two or more types of the above-mentioned homopolymers and copolymers. In addition to the above-mentioned acrylic resins, it is possible to use a rubber such as an SBR, an acrylic acid-modified SBR resin (an SBR-based latex) or gum Arabic; a polyolefin-based resin such as PE; a cellulose-based polymer such as CMC or methyl cellulose (MC); PVA; a fluorine-based resin such as PTFE; a vinyl acetate-based polymer; a poly(alkylene oxide) such as PEO; and the like. This type of polymer may a single polymer or a combination of two or more types thereof. Of these, acrylic resins, SBRs, polyolefin-based resins and CMC are preferred. These water-based binders are not reactive or curable with moisture in the atmosphere, and are therefore preferred from the perspective of being able to easily adjust the extensibility of the heat-resistant barrier layer (without, for example, carrying out moisture control during production).

In addition, in cases where the composition for forming the heat-resistant barrier layer is an organic solvent-based solution (a solution in which the dispersion medium for the binder is mainly an organic solvent), the binder can be a polymer able to be dispersed or dissolved in an organic solvent-based solution. The polymer able to be dispersed or dissolved in an organic solvent-based solution can be, for example, a halogenated vinyl resin such as PVDF. The PVDF is preferably a homopolymer of vinylidene fluoride. Furthermore, the PVDF may be a copolymer of vinylidene fluoride and a vinyl-based monomer able to be copolymerized with vinylidene fluoride. Examples of the vinyl-based monomer able to be copolymerized with vinylidene fluoride include hexafluoropropylene, tetrafluoroethylene, trichlorofluoroethylene and the like. In addition, the polymer able to be dispersed or dissolved in an organic solvent-based solution can be PTFE, polyacrylonitrile, poly(methyl methacrylate) and the like. These polymers may be used singly or as a combination of two or more types thereof. These solvent-based binders are preferred from the perspective of advantageously increasing the extensibility of the heat-resistant barrier layer. However, because these solvent-based binders are reactive and curable with moisture in the atmosphere, moisture control must be carried out during production.

The form of the binder is not particularly limited, and the binder can be used without further modification in the form of particles (a powder), but can also be prepared as a solution or emulsion. It is possible to use two or more binders having different forms. In cases where a particulate binder is used, the average particle diameter thereof (the above-mentioned average particle diameter $D_{50}$) is, for example, approximately 0.09 to 0.15 μm. Moreover, in addition to functioning as binders, the above-mentioned binders can also be used as thickening agents in the composition for forming the heat-resistant barrier layer or in order to realize the functions as other additives.

(Blending Proportions)

The proportion of the filler (typically an inorganic filler) in the overall heat-resistant barrier layer is not particularly limited, but is preferably approximately 90 mass % or higher (for example, 92 to 99.5 mass %, and typically 95 to 99 mass %). In addition, in cases where the heat-resistant barrier layer contains additives such as binders and thickening agents, the proportion of the additives in the heat-resistant barrier layer is preferably approximately 10 mass % or lower (for example, 0.5 to 8 mass %, and typically 1 to 5 mass %). If the proportions of the filler and, if necessary, binder or other additives fall within the above-mentioned ranges, the anchoring properties of the heat-resistant barrier layer and the strength (shape retention properties) of the heat-resistant barrier layer per se are improved. In addition, it is easy to adjust the porosity of the heat-resistant barrier layer within a suitable range and the ion conductivity tends to improve. Furthermore, in cases where the heat-resistant barrier layer is formed on the separator, it is easy to adjust the strength and extensibility of the separator within a suitable range.

(Characteristics of the Heat-Resistant Barrier Layer)

The porosity of the heat-resistant barrier layer is not particularly limited, but from the perspectives of retention of the non-aqueous electrolyte and improving ion conductivity, is preferably 40% or higher (for example, 45% or higher, and typically 50% or higher). In addition, from the perspectives of inhibiting thermal shrinkage and achieving sufficient strength so that defects such as cracks and flaking do not occur, the porosity is preferably 75% or lower (for example, 70% or lower, and typically 65% or lower). Moreover, the porosity of the heat-resistant barrier layer can be calculated using the same method as that used to calculate the porosity of the separator. In this case, the mass W of the heat-resistant barrier layer can be measured as follows, for example. That is, a sample is obtained by cutting a prescribed area of a separator or positive electrode provided with a heat-resistant barrier layer, and the mass of this sample is measured. Next, the mass W of the above-mentioned prescribed area of heat-resistant barrier layer is calculated by subtracting the mass of the above-mentioned prescribed area of separator or positive electrode from the mass of the sample. By converting this calculated mass of the heat-resistant barrier layer into a mass per unit area, it is possible to calculate the mass W (g) of the heat-resistant barrier layer. The porosity of the heat-resistant barrier layer can be adjusted by altering the blending proportions of the constituent components, the coating method, the drying method and the like.

The thickness of the heat-resistant barrier layer is not particularly limited, but is more preferably approximately 1 to 12 μm (for example, 2 to 10 μm, and typically 3 to 8 μm). By setting the thickness of the heat-resistant barrier layer to fall within the above-mentioned range, a short circuit prevention effect and retention of the non-aqueous electrolyte are improved. In addition, if the above-mentioned thickness is 2 μm or higher, it is possible to advantageously block molten product of the molten separator from penetrating into the positive electrode. Furthermore, in cases where the heat-resistant barrier layer is provided on the separator, it is easy to adjust the strength and extensibility of the separator within suitable ranges. The thickness of the heat-resistant barrier layer can be determined by analyzing images taken with a SEM.

(Method for Forming the Heat-Resistant Barrier Layer)

The method for forming the heat-resistant barrier layer is not particularly limited, and it is possible to use, for example, the following method. First, the above-mentioned filler and, if necessary, a binder or other additives are mixed and dispersed in a suitable solvent so as to prepare a paste-like (or slurry-like) composition for forming the heat-resistant barrier layer. The mixing and dispersing procedure can be carried out using a suitable Mixer, such as a disper mill, a Clearmix, a Filmix, a ball mill, a homodisper or an ultrasonic wave disperser. The blending proportions of the filler and, if necessary, binder or other additives in the paste-like (or slurry-like) composition for forming the heat-resistant barrier layer can be the same as the proportions of the components in the above-mentioned heat-resistant barrier layer in terms of solid content.

The solvent used in the composition for forming the heat-resistant barrier layer can be water or a mixed solvent having water as the main component. Solvents other than water that constitute the mixed solvent can be one or more types selected as appropriate from among organic solvents able to be homogeneously mixed with water (lower alcohols such as ethanol, lower ketones and the like). Alternatively, it is possible to use an organic solvent such as NMP, pyrrolidone, methyl ethyl ketone, methyl isobutyl ketone, cyclohexanone, toluene, dimethyl formamide, dimethyl acetamide, or a combination of two or more of these solvents. The content of the solvent in the composition for forming the heat-resistant barrier layer is not particularly limited, but can be 30 to 90 mass % (for example, 40 to 60 mass %) of the overall composition.

Next, the heat-resistant barrier layer can be formed by coating a suitable quantity of the obtained paste-like (or slurry-like) composition for forming the heat-resistant barrier layer on a surface of at least one of the separator sheet or positive electrode sheet and then drying the composition. The process for coating the composition for forming the heat-resistant barrier layer on a surface of at least one of the separator sheet or positive electrode sheet is not particularly limited and can use ordinary conventional coating means. For example, a prescribed quantity of the above-mentioned composition for forming the heat-resistant barrier layer is coated at a uniform thickness on a surface (at least one of the two surfaces) of at least one of the separator sheet or positive electrode sheet by using a suitable coating device (a gravure coater, slit coater, die coater, comma coater, dip coater and the like). The coated material is then dried using suitable drying means so as to remove the solvent from the composition for forming the heat-resistant barrier layer. In cases where the heat-resistant barrier layer is formed on the separator sheet, the above-mentioned drying can be carried out at a temperature that is lower than the melting point of the material that constitutes the separator sheet, for example 110° C. or lower (typically 30 to 80° C.). Alternatively, the drying may be carried out by holding the composition at a low temperature under reduced pressure. By removing the solvent from the composition for forming the heat-resistant barrier layer, it is possible to form a heat-resistant barrier layer that contains the filler as the main component. In this way, it is possible to obtain an electrode body in which the heat-resistant barrier layer is disposed between the positive electrode and the separator.

<<Non-Aqueous Electrolyte>>

The non-aqueous solvent and supporting electrolyte that constitute the non-aqueous electrolyte incorporated in the lithium secondary battery are not particularly limited, and can be the same as those used in conventional lithium secondary batteries. This type of non-aqueous electrolyte is typically an electrolyte liquid having a composition obtained by incorporating a supporting electrolyte in a suitable non-aqueous solvent. The above-mentioned non-aqueous solvent can be, for example, ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, a dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane or γ-butyrolactone, and these can be used either singly or as a combination of two or more types thereof. Of these, a mixed solvent of EC, DMC and EMC is preferred.

In addition, the above-mentioned supporting electrolyte can be, for example, one or more lithium compounds (lithium salts) selected from among $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. Moreover, the concentration of the supporting electrolyte is not particularly limited, but can be approximately 0.1 to 5 mol/L (for example, 0.5 to 3 mol/L, and typically 0.8 to 1.5 mol/L).

The non-aqueous electrolyte may, if necessary, contain arbitrary additives at quantities that do not greatly impair the objective of this invention. The above-mentioned additives can be used in order to achieve one or more objectives such as improving the output performance, storage stability (such as inhibiting a decrease in capacity during storage), cycle characteristics or initial charging and discharging efficiency of the battery. Examples of preferred additives include fluorophosphate salts (preferably difluorophosphate salts. For example, lithium difluorophosphate, which is represented by $LiPO_2F_2$) and lithium bis(oxalato)borate (LiBOB). The concentration of the additives in the non-aqueous electrolyte should generally be 0.20 mol/L or lower (typically 0.005 to 0.20 mol/L), for example 0.10 mol/L or lower (typically 0.01 to 0.10 mol/L). The concentrations of $LiPO_2F_2$ and LiBOB in the non-aqueous electrolyte liquid can be 0.01 to 0.05 mol/L (for example, 0.025 mol/L).

Figure 7:
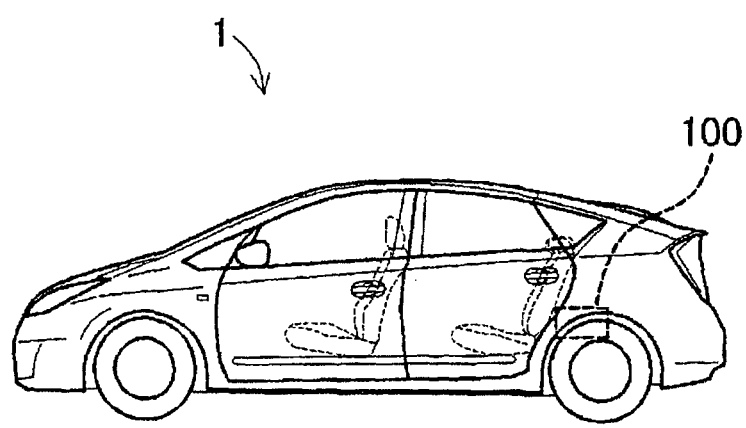
FIG. 7 is a side view that schematically illustrates a vehicle (car) equipped with a lithium secondary battery according to one embodiment.

A lithium secondary battery having such a constitution not only exhibits excellent output characteristics in low SOC regions, as described above, but also exhibits excellent thermal stability, and can therefore be used as a secondary battery in a variety of applications. For example, the lithium secondary battery 100 can be mounted in a vehicle 1 such as a car and advantageously used as a power source for driving a motor and the like that propels the vehicle 1, as shown in FIG. 7. Therefore, this invention can provide a vehicle 1 (typically a car, and especially a car having an electric motor, such as an HV, a PHV, an EV or a fuel cell vehicle) provided with the above-mentioned lithium secondary battery (typically a battery pack in which a plurality of batteries are connected in series) 100 as a power source.

A number of examples relating to this invention will now be explained, but this invention is in no way limited to the following examples. Moreover, in the following explanations, "parts" and "%" mean "parts by mass" and "mass %" respectively, unless otherwise indicated.

Example 1

Production of Positive Electrode Active Substance a Having Hollow Structure

Nickel sulfate ($NiSO_4$), cobalt sulfate ($CoSO_4$), manganese sulfate ($MnSO_4$) and zirconium sulfate ($ZrSO_4$) were dissolved in water so as to produce an aqueous solution $aq_A$ in which the Ni:Co:Mn molar ratio was approximately 0.34:0.33:0.33, the molar ratio of Zr relative to all the transition metal elements was 0.002 and the total concentration of Ni, Co and Mn was 1.8 mol/L. In addition, ammonium paratungstate ($5(NH_4)_2 \cdot 12WO_3$) was dissolved in water so as to produce an aqueous solution $aq_B$ (an aqueous solution of W) in which the concentration of W was 0.1 mol/L. A reaction vessel provided with a stirring device and a nitrogen inlet tube was approximately half filled with water and heated to 40° C. under stirring. While maintaining a non-oxidizing atmosphere having an oxygen concentration of 2.0% under a nitrogen stream in the space in the reaction vessel, appropriate quantities of a 25% (mass %) aqueous solution of sodium hydroxide and 25% (mass %) aqueous ammonia were added to the reaction vessel so as to produce an aqueous alkaline solution (an aqueous solution of $NH_3 \cdot NaOH$) having a pH of 12.0 at a liquid temperature of 25° C. and an ammonia concentration of 20 g/L in the liquid phase. The above-mentioned aqueous solution $aq_A$, aqueous solution $aq_B$, 25% aqueous solution of sodium hydroxide and 25% aqueous ammonia were supplied at a fixed rate to the aqueous alkaline solution in the above-mentioned reaction vessel, thereby crystallizing a hydroxide from the reaction liquid while maintaining the reaction liquid at a pH of 12.0 or higher (specifically 12.0 to 14.0) and an ammonia concentration of 20 g/L (the nucleation stage).

Next, by adjusting the supply rates of the liquids to the above-mentioned reaction vessel, the above-mentioned nuclei were subjected to a particle growth reaction while adjusting the pH of the reaction liquid to lower than 12.0 (specifically, 10.5 to 11.9) and maintaining the ammonia concentration in the liquid phase within the prescribed range of 1 to 20 g/L (the particle growth stage). The product was removed from the reaction vessel, washed and dried so as to obtain a complex hydroxide in which the (Ni+Co+Mn):Zr:W molar ratio was 100:0.2:0.5 (the precursor hydroxide). This precursor hydroxide was heat treated in an air atmosphere at 150° C. for 12 hours. Next, $Li_2CO_3$ (a lithium source) and the above-mentioned precursor hydroxide were mixed so that the Li:(Ni+Co+Mn) molar ratio (that is, $m_{Li}:m_T$) was 1.14:1 (the mixing step). This unfired mixture was fired in an air atmosphere at 950° C. for 7 hours. Here, the rate of temperature increase was 5° C./min until the temperature reached 950° C. The fired product was then cooled, pulverized and sieved. A positive electrode active substance A having an average compositional formula represented by $Li_{1.14}Ni_{0.34}Co_{0.33}Mn_{0.33}Zr_{0.002}W_{0.005}O_2$ was thereby obtained. It was confirmed by observing SEM images that this positive electrode active substance A (secondary particles) had a hollow structure. The secondary particles had an average particle diameter ($D_{50}$) of 5.4 μm, and the particle diameter (length L1) of the primary particles was 0.7 μm. In addition, the thickness of the outer shell (shell portion) of the secondary particles was 1.2 μm, and the particle porosity was 23.7%. In addition, the BET specific surface area of the positive electrode active substance A was adjusted within the range 0.5 to 1.9 $m^2/g$.

[Production of Positive Electrode Sheet]

The above-mentioned positive electrode active substance A, acetylene black (AB) as an electrically conductive material and PVDF as a binder were mixed at a mass ratio of 90:8:2 in NMP so as to produce a slurry-like composition for forming a positive electrode mixture layer. This composition was uniformly coated on both surfaces of a long sheet-like aluminum foil (a positive electrode current collector: thickness 15 so that the coating weight on each side of the foil was 11.2 $mg/cm^2$ (in terms of solid content), and the composition was then dried and pressed so as to produce a sheet-like positive electrode (a positive electrode sheet) in which the positive electrode mixture layer was formed on both surfaces of the positive electrode current collector. The density of the positive electrode mixture layer was adjusted within the range 1.8 to 2.4 $g/cm^3$.

[Production of Negative Electrode Active Substance]

Natural graphite powder and pitch were mixed and impregnated at a mass ratio of 96:4 and then fired at 800 to 1300° C. in an inert atmosphere for 10 hours so as to obtain carbon particles having a structure whereby the surface of graphite particles was coated with amorphous carbon. These carbon particles were sieved so as to obtain a negative electrode active substance having an average particle diameter ($D_{50}$) of 5 to 40 μm and a BET specific surface area of 3.0 to 6.0 $m^2/g$.

[Production of Negative Electrode Sheet]

The above-mentioned negative electrode active substance, a styrene-butadiene copolymer (SBR) as a binder and CMC as a thickening agent were mixed at a mass ratio of 98.6:0.7:0.7 in ion exchanged water so as to produce a slurry-like composition for forming a negative electrode mixture layer. This composition was uniformly coated on both surfaces of a long sheet-like copper foil (thickness 10 μm) so that the coating weight on each side of the foil was 7.3 $mg/cm^2$ (in terms of solid content), and the composition was then dried and pressed so as to produce a sheet-like negative electrode (a negative electrode sheet) in which the negative electrode mixture layer was formed on both surfaces of the negative electrode current collector. The density of the negative electrode mixture layer was adjusted within the range 0.9 to 1.3 $g/cm^3$.

[Production of Separator Sheet Having Heat-Resistant Barrier Layer]

A long separator sheet (thickness 20 μm) having a three layer structure formed by PP/PE:/PP was prepared as a separator sheet. The thickness of each of the PP layers was 7 μm, and the thickness of the PE layer was 6 μm. A heat-resistant barrier layer was formed on one surface of this separator sheet. That is, alumina ("AKP-3000" manufactured by Sumitomo Chemical Co., Ltd., average particle diameter 0.48 μm) as an inorganic filler, an acrylic binder as a binder and CMC as a thickening agent were mixed at a mass ratio of 96.7:2.6:0.7 in ion exchanged water so as to produce a slurry-like composition for forming a heat-resistant barrier layer. The mixing was achieved by carrying out preliminary dispersion for 5 minutes at 15000 rpm and then carrying out main dispersion for 15 minutes at 20000 rpm using a "Clearmix" ultrasonic wave disperser (manufactured by M Technique Co., Ltd.). The obtained composition for forming a heat-resistant barrier layer was coated on the entire surface of one surface of the separator sheet using a gravure coating method and then dried at a temperature of 70° C. so as to form a heat-resistant barrier layer. In the gravure coating, the line speed of the separator sheet was 3 m/min and the gravure roll speed was 3.8 m/min, giving a speed ratio (gravure speed/line speed) of 1.27. A separator sheet having a heat-resistant barrier layer, wherein a heat-resistant barrier layer having a thickness of 5.0 μm was formed on one surface of the separator sheet, was thereby produced.

[Construction of Lithium Secondary Battery]

The obtained positive electrode sheet and negative electrode sheet were laminated and wound via two sheets of the above-mentioned separator sheet having a heat-resistant barrier layer, and this wound body was squashed from the lateral direction so as to produce a wound electrode body having a flattened shape. The separator sheet was disposed so that the heat-resistant barrier layer faced the positive electrode sheet. Electrode terminals were connected to the terminals of the positive and negative electrode current collectors in the obtained wound electrode body, and the wound electrode body was placed in an angular aluminum battery case together with the non-aqueous electrolyte liquid, and the battery case was then sealed. The non-aqueous electrolyte liquid was obtained by incorporating $LiPF_6$ as a supporting electrolyte at a concentration of approximately 1 mol/L in a mixed solvent containing EC, EMC and DMC at a volume ratio of 3:3:4. Moreover, it is also possible to use an electrolyte liquid obtained by dissolving a difluorophosphate salt ($LiPO_2F_2$) and LiBOB either singly or as a mixture at a proportion of approximately 0.05 mol/L. A test lithium secondary battery having a battery capacity of 3.8 Ah was assembled in this way. In this secondary battery, the above-mentioned initial capacity ratio ($C_N/C_P$) was adjusted to 1.5 to 1.9.

Example 2

A test lithium secondary battery according to Example 2 was constructed by producing a separator sheet having a heat-resistant barrier layer in the same way as in Example 1, except that a heat-resistant barrier layer was formed on each surface of the separator sheet (thickness on each surface: 5.0 μm).

Example 3

A test lithium secondary battery according to Example 3 was constructed in the same way as in Example 1, except that the separator sheet was disposed so that the heat-resistant barrier layer faced the negative electrode sheet.

Example 4

Production of Positive Electrode Active Substance B Having No Hollow Portions

Ion exchanged water was placed in a reaction vessel provided with an overflow pipe and having an internal vessel temperature of 40° C., and a non-oxidizing atmosphere having an oxygen gas ($O_2$) concentration of 2.0% was prepared in the reaction vessel by streaming nitrogen gas while stirring the ion exchanged water. Next, a 25% aqueous solution of sodium hydroxide and 25% aqueous ammonia were added in the reaction vessel so that the pH, measured at a liquid temperature of 25° C., was 12.0 and the $NH_4^+$ concentration in the liquid was 15 g/L. A mixed aqueous solution was produced by dissolving nickel sulfate, cobalt sulfate and manganese sulfate in water so that the Ni:Co:Mn molar ratio was approximately 0.34:0.33:0.33 and the total molar concentration of these metallic elements was 1.8 mol/L. This mixed aqueous solution, a 25% aqueous solution of NaOH and 25% aqueous ammonia were supplied to the above-mentioned reaction vessel at a fixed rate so that the average residence time of the precipitated NiCoMn complex hydroxide particles was 10 hours, continuous crystallization was brought about by controlling the pH of the reaction liquid to 12.0 and the $NH_4^+$ concentration to 15 g/L, and after the reaction vessel returned to a steady state, the NiCoMn complex hydroxide (the product) was continuously removed from the above-mentioned overflow pipe, washed with water and dried. Complex hydroxide particles having a composition represented by $Ni_{0.34}Co_{0.33}Mn_{0.33}(OH)_{2+\alpha}$ (here, c in the formula is such that $0 \le \alpha \le 0.5$) were obtained in this way.

The above-mentioned complex hydroxide particles were heat treated in an air atmosphere at 150° C. for 12 hours. Next, $Li_2CO_3$ as a lithium source and the above-mentioned complex hydroxide particles were mixed so that the Li:(Ni+Co+Mn) molar ratio (that is, $m_{\mu}:m_T$) was 1.14:1 (the mixing step). This mixture was fired for 4 hours at 760° C. and then for 10 hours at 950° C. The fired product was then pulverized and sieved. A positive electrode active substance B having an average compositional formula represented by $Li_{1.14}Ni_{0.34}Co_{0.33}Mn_{0.33}O_2$ was thereby obtained. It was confirmed by observing SEM images that this positive electrode active substance B had no hollow portions. The average particle diameter of the secondary particles was 5.5 pin, the particle diameter $P_1$ of the primary particles was 0.9 μm, and the thickness of the outer shell of the secondary particles was 4.8 μm. In addition, the BET specific surface area of the positive electrode active substance B was adjusted within the range 0.5 to 1.9 m²/g.

[Construction of Lithium Secondary Battery]

A test lithium secondary battery according to Example 4 was constructed in the same way as Example 3, except that the above-mentioned positive electrode active substance B was used instead of the positive electrode active substance A.

[Evaluation of Thermal Stability]

The lithium secondary batteries constricted as described above were evaluated for thermal stability under the following conditions. That is, after carrying out suitable initial conditioning treatment, the battery was forcibly shut down by carrying out a continuous main charging test, and the size of the subsequent leakage current was evaluated. Specifically, the initial conditioning treatment included performing an operation of carrying out constant current charging at room temperature (25° C.) for 3 hours at a charging rate of 1/10 C and then charging at a constant current and voltage at a charging rate of 1/3 C until the voltage reached 4.1 V and an operation of carrying out constant current discharging at a discharging rate of 1/3 C until the voltage reached 3.0 V, and repeating these operations 2 to 3 times.

Figure 6:
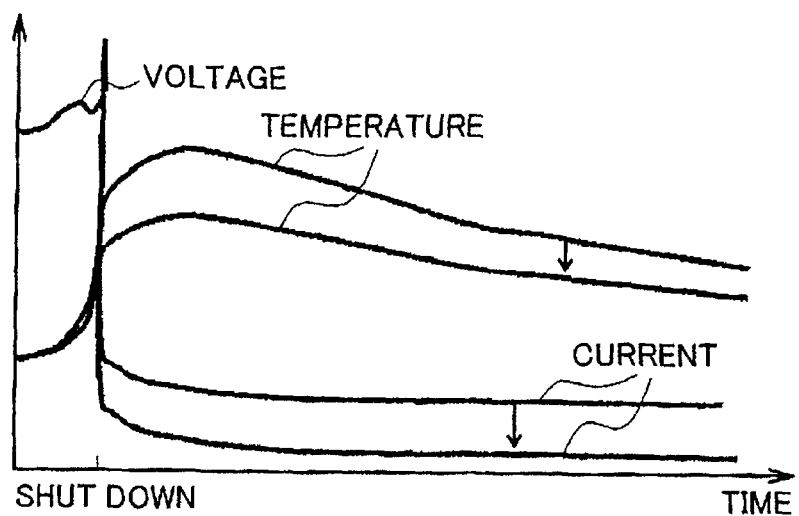
FIG. 6 is a chart that illustrates the relationship between the current in a lithium secondary battery during overcharging and the temperature inside the battery.

The continuous main charging test included carrying out low current charging at a temperature of −10° C. until a SOC 30% state was reached and then carrying out constant current charging at a current of 40 A from the SOC 30% state until the maximum attained voltage reached 40 V. In this continuous main charging test, the current (leakage current) was measured for 10 minutes after the battery shut down. The maximum current within this 10 minute period is shown in table 1 as the "leakage current". Here, the relationship between the current of the lithium secondary battery and the temperature inside the battery in the above-mentioned continuous main charging test is shown in FIG. 6. FIG. 6 shows that by suppressing current (leakage current) following shut down, the temperature inside the battery decreases (the direction shown by the arrows in the diagram). From this relationship, it can be evaluated that if the leakage current is 2 A or lower, the quantity of heat generated in the battery following shut down is suppressed and excellent thermal stability is achieved.

TABLE 1

|  | Example 1 | Example 2 | Example 3 | Example 4 |
|---|---|---|---|---|
| Heat-resistant barrier layer | | | | |
| Thickness (μm) | 5.0 | 5.0 | 5.3 | 5.2 |
| Formation location | One side | Both sides | One side | One side |
| Disposition | Facing positive electrode | Facing positive and negative electrodes | Facing negative electrode | Facing negative electrode |
| Positive electrode active substance | A (hollow) | A (hollow) | A (hollow) | B (no hollows) |
| Leakage current (A) | 0.5 | 0.8 | 2.8 | 0.9 |

The secondary batteries according to Examples 1 and 2, which used a positive electrode active substance having a hollow structure and which had a heat-resistant barrier layer disposed between the positive electrode and the separator, as shown in Table 1, had a leakage current of 2 A or lower in the thermal stability test. However, the secondary battery according to Example 3, which used a positive electrode active substance having a hollow structure and which had a heat-resistant barrier layer disposed between the negative electrode and the separator, as shown in FIG. 1, had a leakage current in excess of 2 A in the thermal stability test. Example 4, which used a positive electrode active substance having no hollows, had a leakage current of 2 A or lower despite having a heat-resistant barrier layer disposed between the negative electrode and the separator. From these results, it can be understood that an increase in the above-mentioned leakage current is unique to cases in which a positive electrode active substance having a hollow structure is used. In addition, it can be understood that by disposing a heat-resistant barrier layer between the positive electrode and the separator in a secondary battery that uses a positive electrode active substance having a hollow structure, the quantity of heat generated in a battery following shut down can be suppressed and excellent thermal stability can be achieved. This is thought to be because the heat-resistant barrier layer is disposed between the positive electrode and the separator, meaning that molten product of the separator is blocked by the heat-resistant barrier layer and inhibited from penetrating into the positive electrode, thereby inhibiting a deterioration in the shape retention properties of the separator.

Specific examples of this invention have been described in detail above, but these examples are merely exemplary, and do not limit the scope of the present invention. The invention disclosed here can include modes obtained by variously modifying or altering the specific examples shown above.

The invention claimed is:

1. A non-aqueous electrolyte secondary battery comprising:
a positive electrode that contains a positive electrode active substance having a hollow structure, which has a shell portion and a hollow portion formed inside the shell portion;
a negative electrode;
a separator disposed between the positive electrode and the negative electrode; and
a heat-resistant barrier layer disposed between the positive electrode and the separator,
wherein the heat-resistant barrier layer is provided on an entire surface of the separator.

2. The non-aqueous electrolyte secondary battery according to claim 1, wherein a particle porosity of the positive electrode active substance is 15% or higher.

3. The non-aqueous electrolyte secondary battery according to claim 1, wherein a thickness of the shell portion of the positive electrode active substance is 2 μm or lower.

4. The non-aqueous electrolyte secondary battery according to claim 1, wherein a thickness of the heat-resistant barrier layer is 2 μm or higher.

5. The non-aqueous electrolyte secondary battery according to claim 1, wherein the separator is constituted from a polyolefin-based resin.

6. The non-aqueous electrolyte secondary battery according to claim 1, wherein the heat-resistant barrier layer contains a filler as a main component, and the filler is at least one type of material selected from among the group consisting of alumina, boehmite, silica, titania, zirconia, calcia and magnesia.

7. A vehicle equipped with the non-aqueous electrolyte secondary battery according to claim 1.

* * * * *